United States Patent
Korchev et al.

(10) Patent No.: US 12,244,018 B2
(45) Date of Patent: Mar. 4, 2025

(54) ANODE ELECTRODE COMPOSITIONS FOR BATTERY APPLICATIONS

(71) Applicant: Cabot Corporation, Boston, MA (US)

(72) Inventors: Andriy Korchev, Westford, MA (US); Kevin Girard, Boston, MA (US); Aurelien L. DuPasquier, Westford, MA (US); Miodrag Oljaca, Concord, MA (US)

(73) Assignee: Cabot Corporation, Boston, MA (US)

( * ) Notice: Subject to any disclaimer, the term of this patent is extended or adjusted under 35 U.S.C. 154(b) by 662 days.

(21) Appl. No.: 17/438,200

(22) PCT Filed: Feb. 21, 2020

(86) PCT No.: PCT/US2020/019195
§ 371 (c)(1),
(2) Date: Sep. 10, 2021

(87) PCT Pub. No.: WO2020/197670
PCT Pub. Date: Oct. 1, 2020

(65) Prior Publication Data
US 2022/0181625 A1    Jun. 9, 2022

Related U.S. Application Data
(60) Provisional application No. 62/822,101, filed on Mar. 22, 2019.

(51) Int. Cl.
*H01M 4/62* (2006.01)
*C01B 32/174* (2017.01)
(Continued)

(52) U.S. Cl.
CPC .......... *H01M 4/625* (2013.01); *C01B 32/174* (2017.08); *C09C 1/48* (2013.01); *H01M 4/133* (2013.01);
(Continued)

(58) Field of Classification Search
CPC . H01M 4/133; H01M 4/139; H01M 2004/028
See application file for complete search history.

(56) References Cited

U.S. PATENT DOCUMENTS 7,691,533 B2    4/2010   Sano et al.
9,133,031 B2    9/2015   Liu et al.
(Continued)

FOREIGN PATENT DOCUMENTS

JP    2005/063955 A    3/2005
JP    2016/025077 A    2/2016
(Continued)

OTHER PUBLICATIONS

The International Search Report and The Written Opinion of the International Searching Authority, or the Declaration of International Application No. PCT/US2020/019195, mailed May 25, 2020.
(Continued)

*Primary Examiner* — Khanh T Nguyen

(57) ABSTRACT

Carbon nanostructures are used to prepare electrode compositions for lithium ion batteries. In one example, an anode for a Li ion battery includes three-dimensional carbon nanostructures made of highly entangled nanotubes, fragments of carbon nanostructures and/or fractured nanotubes, which are derived from the carbon nanostructures, are branched and share walls with one another. Amounts of carbon nanostructures employed can be less than or equal to 0.5 weight % relative to the weight of the electrode composition.

23 Claims, 12 Drawing Sheets

(51) Int. Cl.

| | |
|---|---|
| *C09C 1/48* | (2006.01) |
| *H01M 4/133* | (2010.01) |
| *H01M 4/139* | (2010.01) |
| *H01M 4/36* | (2006.01) |
| *H01M 4/48* | (2010.01) |
| *H01M 4/583* | (2010.01) |
| *H01M 4/587* | (2010.01) |
| *H01M 10/0525* | (2010.01) |
| *C08K 3/04* | (2006.01) |
| *H01M 4/02* | (2006.01) |

(52) U.S. Cl.
CPC ......... *H01M 4/139* (2013.01); *H01M 4/366* (2013.01); *H01M 4/483* (2013.01); *H01M 4/583* (2013.01); *H01M 4/587* (2013.01); *H01M 4/621* (2013.01); *H01M 4/622* (2013.01); *H01M 10/0525* (2013.01); *C01B 2202/04* (2013.01); *C01B 2202/06* (2013.01); *C01B 2202/22* (2013.01); *C01B 2202/34* (2013.01); *C01B 2202/36* (2013.01); *C01P 2004/03* (2013.01); *C01P 2004/04* (2013.01); *C01P 2004/54* (2013.01); *C01P 2006/12* (2013.01); *C01P 2006/19* (2013.01); *C01P 2006/22* (2013.01); *C08K 3/041* (2017.05); *H01M 2004/028* (2013.01)

(56) References Cited

U.S. PATENT DOCUMENTS

| | | | |
|---|---|---|---|
| 10,135,071 | B2 | 11/2018 | Blizanac et al. |
| 10,141,574 | B2 | 11/2018 | Yoo et al. |
| 2005/0186378 | A1 | 8/2005 | Bhatt |
| 2013/0004657 | A1 | 1/2013 | Xu et al. |
| 2013/0101495 | A1* | 4/2013 | Peterson .............. C08K 3/04 423/447.2 |
| 2013/0143087 | A1 | 6/2013 | Liu et al. |
| 2014/0065447 | A1 | 3/2014 | Liu et al. |
| 2014/0099493 | A1 | 4/2014 | Liu et al. |
| 2014/0332731 | A1 | 11/2014 | Ma et al. |
| 2014/0377659 | A1 | 12/2014 | Oljaca et al. |
| 2017/0110765 | A1 | 4/2017 | Yadav |
| 2018/0102549 | A1 | 4/2018 | Yordem |
| 2018/0233734 | A1 | 8/2018 | Ahn et al. |
| 2022/0131156 | A1 | 4/2022 | Korchev et al. |
| 2022/0158193 | A1 | 5/2022 | DuPasquier et al. |

FOREIGN PATENT DOCUMENTS

| | | | | |
|---|---|---|---|---|
| KR | 2008/0021002 | A | | 3/2008 |
| KR | 2011/0063375 | A | | 6/2011 |
| KR | 20140099871 | A | * 8/2014 | .............. H01M 4/86 |
| TW | 201431602 | A | | 8/2014 |
| WO | WO 2013/066593 | A1 | | 5/2013 |
| WO | WO 2013/114094 | A1 | | 8/2013 |

OTHER PUBLICATIONS

The International Search Report and The Written Opinion of the International Searching Authority, or the Declaration of International Application No. PCT/US2020/019198, mailed May 7, 2020.
The International Search Report and The Written Opinion of the International Searching Authority, or the Declaration of International Application No. PCT/US2020/019199, mailed May 12, 2020.
Zhao, Xin, et al., "Spray Deposition of Steam Treated and Functionalized Single-Walled and Multi-Walled Carbon Nanotube Films for Superapacitors", 2009 IOP Publishing Ltd., Nanotechnology 20 (2009), 9 pp.

* cited by examiner

ANODE ELECTRODE COMPOSITIONS FOR BATTERY APPLICATIONS

RELATED APPLICATIONS

This application is a national phase application of PCT/US2020/019195, filed on Feb. 21, 2020, which claims the benefit under 35 USC 119(e) of U.S. Provisional Patent Application No. 62/822,101, both entitled Anode Electrode Compositions for Battery Applications, filed on Mar. 22, 2019. Both applications are incorporated herein by this reference in their entirety.

BACKGROUND OF THE INVENTION

Lithium ion batteries are commonly used sources of electrical energy for numerous applications ranging from electronic devices to electric vehicles. A lithium-ion battery typically includes a negative electrode and a positive electrode in an arrangement that allows lithium ions and electrons to move to and from the electrodes during charging and discharging. An electrolyte solution in contact with the electrodes provides a conductive medium in which the ions can move. To prevent direct reaction between the electrodes, an ion-permeable separator is used to physically and electrically isolate the electrodes. During operation, electrical contact is made to the electrodes, allowing electrons to flow through the device to provide electrical power, and lithium ions to move through the electrolyte from one electrode to the other.

The positive electrode typically includes a conductive substrate supporting a mixture (e.g., applied as a paste) having at least one electroactive material and a binder. The electroactive material (a lithium transition metal oxide, for example) is capable of receiving and releasing lithium ions. The binder, polyvinylidene fluoride (PVDF), for example, is used to provide mechanical integrity and stability to the electrode. In some cases, the positive electrode also includes a conductive additive.

Most commercially available lithium ion batteries have anodes that contain graphite, a material capable of incorporating lithium through an intercalation mechanism. Typically, lithium is added to the graphite anode during the charging cycle and removed as the battery is used. Possible alternatives to graphite include materials such as lithium titanate, tin oxide, $SiO_x$ (with x typically being 1.04, 1.06, etc.) and silicon.

In addition to the active anode component (graphite, silicon, $SiO_x$, etc.), anode compositions can further include a binder component and an electrically conductive additive, e.g., a powder, that is distinct from the active material. One known carbon conductive additive (CCA) is carbon black (CB).

SUMMARY OF THE INVENTION

In spite of the progress made, existing anode compositions can present problems. For instance, metallic lithium (Li) plating on graphite negative electrodes under critical charging conditions accelerates performance degradation and poses safety hazards for LIBs. It is believed that anode Li plating occurs when the intercalation of $Li^+$ ions into graphite becomes sluggish, causing an increase of anode polarization. Studies appear to indicate that the lithium ion intercalation process involves three successive steps: the diffusion of solvated $Li^+$ ions in the electrolyte, the interfacial charge-transfer process, and the diffusion of Li in the solid electrode material. A slowdown in any of these steps can result in anode lithium plating. Factors thought to influence the lithium ion intercalation process, resulting in anode lithium plating, include, for example, low-temperature charging, overcharging, high-rate charging, non-uniform current and potential distributions and long-term cycling.

Alloy-type anodes often exhibit relatively poor cycle life and coulombic efficiency. It is believed that these effects could be related to the formation of a two-phase region during lithiation and delithiation. The two-phase region can lead to internal stress within the anode materials if one phase undergoes a larger volume change than the other phase. This internal stress can result in the disintegration of the anode material over time. Volume changes also can result in the deterioration of electrical contact between the active anode material, conductive particles, and binder. In turn, the deterioration of electrical contact can result in diminished capacity (i.e., amount of lithium that can be incorporated per unit mass of the active anode material) over the cycle life of the anode.

In specific examples, a capacity anode material such as silicon or $SiO_x$ has been associated with high irreversible capacity loss and poor discharge and recharge cycling related to structural changes and anomalously large volume expansions. The structural changes and large volume changes can destroy the structural integrity of the electrode, thereby decreasing the cycling efficiency. $SiO_x$- and particularly silicon-graphite anodes can exhibit large dimensional changes upon cycling, resulting in the loss of contact between the active material and the CCA.

A need continues to exist for improved lithium ion batteries (LIBs). It is desirable, for instance, to design batteries having a negative electrode configured to address one or more of the deficiencies associated with existing anodes and anode compositions. For example, a need exists for conductive additives such as, for instance CCAs, that can control anode deterioration, associated, for instance, with Li plating. Also of interest are conductive additives that can improve the cycling life of the battery and contribute to the overall anode performance, especially when provided at low loading levels.

Some CCA materials with the potential of enhancing performance and avoiding battery failure include conductive carbon black (CB), e.g., with aciniform morphology, and carbon nanotubes (CNTs).

Since, generally, the CCA and the binder are not involved in the electrochemical reactions that generate electrical energy, these materials can negatively affect certain performance characteristics (e.g., capacity and energy density) of the battery, as they effectively lower the amount of active material that can be contained in a given volume. To achieve a certain performance level, however, a CCA such as CB may be required in relatively high amounts (for example, at least 1 weight % (wt %) of a graphite anode).

CNTs may be thought of as an attractive additive material for anode compositions. However, some difficulties can be encountered when working with CNTs. These include limited dispersibility in some media and inadequate purity. It is believed that at least some of these issues are caused by the strong Van der Waals forces that occur between individual carbon nanotubes, causing them to agglomerate into bundles or ropes. Such manifestations can result in lower than anticipated property enhancements and/or inconsistent performance. In some cases, techniques available for de-bundling carbon nanotubes into individual, well-separated members, can detrimentally impact the desirable property enhancements relative to the enhancements anticipated with pristine carbon nanotubes.

It was discovered that using carbon nanostructures (CNSs) to prepare anode compositions for lithium ion (Li+) batteries had a positive impact on anode performance and addressed at least some of the problems discussed above. As used herein, the term "carbon nanostructure" or "CNS" refers to a plurality of carbon nanotubes (CNTs), multiwall (also known as multi-walled) carbon nanotubes (MWCNTs), in many cases, that can exist as a polymeric structure by being interdigitated, branched, crosslinked, and/or sharing common walls with one another. Thus, CNSs can be considered to have CNTs, such as, for instance, MWCNTs, as a base monomer unit of their polymeric structure. Typically, CNSs are grown on a substrate (e.g., a fiber material) under CNS growth conditions. In such cases, at least a portion of the CNTs in the CNSs can be aligned substantially parallel to one another, much like the parallel CNT alignment seen in conventional carbon nanotube forests.

It was found that even when provided at very low levels (e.g., less than 1 wt %, and often no more than about 0.5 wt %, or even no more than 0.1 wt %), use of CNSs reduced or eliminated Li plating on a graphite anode during aggressive charging and/or significantly improved the cycling life of the battery. In some cases, use of CNSs may also improve low temperature cycling. With graphite anode compositions, the improvements observed with even small amounts of CNSs are surprising, considering that graphite itself has good electrical properties. Without wishing to be bound by a particular explanation, it is believed that this effect is due, at least in part, to the formation of fragments that sustain branching, allowing better connectivity between them and creating enhanced conductivity connections. It is also possible that CNSs enhance electrolyte retention around graphite, which is critical for low temp performance and long-term cycling. With anode compositions that contain silicon or $SiO_x$ (materials less conductive than graphite), at least some of the benefits associated with the use of CNSs may be due to improvements in electrical conductivity, connectivity and silicon swelling management.

It was also found that a conductive additive such as described herein brings about anode properties (e.g., capacity retention with cycling) typically achieved at higher loadings when using a conventional additive such as, for example, carbon black (CB). Relative to a comparative electrode composition (containing, e.g., CB as a conductive additive), an electrode additive according to principles described herein will not typically require the use of higher amounts to achieve the same or essentially the same electrical properties; in many cases, the required levels of the CNS-based additive will be lower than those needed with traditional carbon additives.

Stated differently, use of a composition prepared from a CNS starting material will yield electrodes that exhibit at least the same and often improved electrical properties relative to comparative electrode compositions formulated with conventional carbon additives such as CB at the same level of loading.

When used as a CCA, CNSs may present several advantages over ordinary CNTs, possibly due to the CNS unique structure. Also, in contrast to CNTs, CNSs can be provided in forms (powders, for instance) that are easy and safe to handle on the industrial scale. In some cases, CNSs form stable dispersions in a desired solvent.

Thus, in some of its aspects, the invention relates to a composition prepared by using carbon nanostructures. In one embodiment, the composition comprises an active anode material and at least one material selected from the group consisting of: carbon nanostructures, fragments of carbon nanostructures and fractured multiwall carbon nanotubes. The carbon nanostructures or fragments of carbon nanostructures include a plurality of multiwall carbon nanotubes that are crosslinked in a polymeric structure by being branched, interdigitated, entangled and/or sharing common walls. The fractured multiwall carbon nanotubes are derived from carbon nanostructures and are branched and share common walls with one another. The active anode material can include graphite, silicon, SiOx, silicon-graphite composite or lithium titanate. In specific implementations, the composition is in the form of paste, a slurry or a solid.

Other aspects of the invention relate to electrodes and/or batteries that include carbon nanostructures, fragments of carbon and/or fractured carbon nanotubes, such as, for instance, fractured multiwalled carbon nanotubes.

In further aspects of the invention carbon nanostructures are employed to prepare compositions, anode electrodes and/or batteries.

In some embodiments, a conductive additive that includes one or more of CNSs, CNS fragments and/or fractured CNTs, e.g., MWCNTs, imparts the desired electrical properties even when the additive is incorporated in relatively low amounts, e.g., less than 1 weight percent (wt %) and often no more than 0.5 wt % or even no more than 0.1 wt %. It is believed that this effect is due, at least in part, to the formation of fragments that sustain branching, allowing better connectivity between them and creating enhanced conductivity connections.

Practicing aspects of the invention can reduce the amount of conductive additive necessary to achieve a certain performance, making possible the production of electrodes that contain higher amounts of active electrode materials in the given electrode volume. In some embodiments, the CNSs employed generate fragments (including partially fragmented CNSs) and/or fractured CNTs, MWCNTs, for example. These structures can bring about improved connectivity between one another, thereby enhancing electrical conductivity in the electrode.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
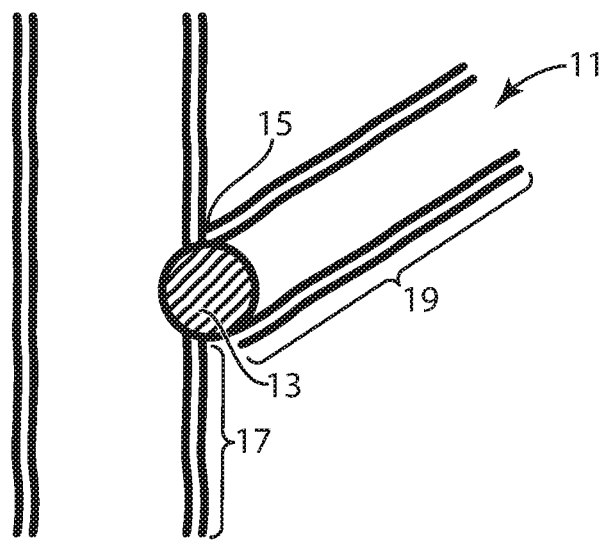
FIGS. 1A and 1B are diagrams illustrating differences between a Y-shaped MWCNT, not in or derived from a carbon nanostructure (FIG. 2A), and a branched MWCNT (FIG. 2B) in a carbon nanostructure.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Generally, the invention relates to a composition that can be used to produce electrodes for batteries, methods of making the composition, and applications of the compositions in electrodes (e.g., anodes) and batteries. In many of its aspects, the invention relates to a composition suitable for lithium ion batteries. In one example, the batteries of interest are rechargeable LIBs.

Examples of various types of lithium ion batteries (according to the acronyms for the electroactive material employed to form the cathode, often an intercalation compound) include: LCO (lithium cobalt oxide), LMO (lithium manganese oxide), NCM (lithium nickel cobalt manganese oxide), NCA (lithium nickel cobalt aluminum oxide), LCP (lithium cobalt phosphate), LFP (lithium iron phosphate), LFSF (lithium iron fluorosulfate), LTS (lithium titanium sulfide) and others, as known in the art or as developed in the future. Materials such as these are generally referred to herein as "lithium transition metal compounds", e.g., "lithium transition metal oxides".

Some embodiments relate to a composition that consists of, consists essentially of or comprises a conductive additive. This composition can be combined with a typical active anode material, with or without a binder, to form a negative electrode composition, in the form of a slurry or paste, for instance, which can be applied to a current collector to form an anode. In turn, the anode can be used to produce a battery.

The composition is prepared using carbon nanostructures (CNSs, singular CNS), a term that refers herein to a plurality of carbon nanotubes (CNTs) that that are crosslinked in a polymeric structure by being branched, e.g., in a dendrimeric fashion, interdigitated, entangled and/or sharing common walls with one another. Operations conducted to prepare the compositions, electrodes and/or batteries described herein can generate CNS fragments and/or fractured CNTs. Fragments of CNSs are derived from CNSs and, like the larger CNS, include a plurality of CNTs that are crosslinked in a polymeric structure by being branched, interdigitated, entangled and/or sharing common walls. Fractured CNTs are derived from CNSs, are branched and share common walls with one another.

Highly entangled CNSs are macroscopic in size and can be considered to have a carbon nanotube (CNT) as a base monomer unit of its polymeric structure. For many CNTs in the CNS structure, at least a portion of a CNT sidewall is shared with another CNT. While it is generally understood that every carbon nanotube in the CNS need not necessarily be branched, crosslinked, or share common walls with other CNTs, at least a portion of the CNTs in the carbon nanostructure can be interdigitated with one another and/or with branched, crosslinked, or common-wall carbon nanotubes in the remainder of the carbon nanostructure.

As known in the art, carbon nanotubes (CNT or CNTs plural) are carbonaceous materials that include at least one sheet of $sp^2$-hybridized carbon atoms bonded to each other to form a honey-comb lattice that forms a cylindrical or tubular structure. The carbon nanotubes can be single-walled carbon nanotubes (SWCNTs) or multi-walled carbon nanotubes (MWCNTs). SWCNTs can be thought of as an allotrope of $sp^2$-hybridized carbon similar to fullerenes. The structure is a cylindrical tube including six-membered carbon rings. Analogous MWCNTs, on the other hand, have several tubes in concentric cylinders. The number of these concentric walls may vary, e.g., from 2 to 25 or more. Typically, the diameter of MWNTs may be 10 nm or more, in comparison to 0.7 to 2.0 nm for typical SWNTs.

In many of the CNSs used in this invention, the CNTs are MWCNTs, having, for instance, at least 2 coaxial carbon nanotubes. The number of walls present, as determined, for example, by transmission electron microscopy (TEM), at a magnification sufficient for analyzing the number of wall in a particular case, can be within the range of from 2 to 30 or so, for example: 4 to 30; 6 to 30; 8 to 30; 10 to 30; 12 to 30; 14 to 30; 16 to 30; 18 to 30; 20 to 30; 22 to 30; 24 to 30; 26 to 30; 28 to 30; or 2 to 28; 4 to 28; 6 to 28; 8 to 28; 10 to 28; 12 to 28; 14 to 28; 16 to 28; 18 to 28; 20 to 28; 22 to 28; 24 to 28; 26 to 28; or 2 to 26; 4 to 26; 6 to 26; 8 to 26; 10 to 26; 12 to 26; 14 to 26; 16 to 26; 18 to 26; 20 to 26; 22 to 26; 24 to 26; or 2 to 24; 4 to 24; 6 to 24; 8 to 24; 10 to 24; 12 to 24; 14 to 24; 16 to 24; 18 to 24; 20 to 24; 22 to 24; or 2 to 22; 4 to 22; 6 to 22; 8 to 22; 10 to 22; 12 to 22; 14 to 22; 16 to 22; 18 to 22; 20 to 22; or 2 to 20; 4 to 20; 6 to 20; 8 to 20; 10 to 20; 12 to 20; 14 to 20; 16 to 20; 18 to 20; or 2 to 18; 4 to 18; 6 to 18; 8 to 18; 10 to 18; 12 to 18; 14 to 18; 16 to 18; or 2 to 16; 4 to 16; 6 to 16; 8 to 16; 10 to 16; 12 to 16; 14 to 16; or 2 to 14; 4 to 14; 6 to 14; 8 to 14; 10 to 14; 12 to 14; or 2 to 12; 4 to 12; 6 to 12; 8 to 12; 10 to 12; or 2 to 10; 4 to 10; 6 to 10; 8 to 10; or 2 to 8; 4 to 8; 6 to 8; or 2 to 6; 4-6; or 2 to 4.

Since a CNS is a polymeric, highly branched and cross-linked network of CNTs, at least some of the chemistry observed with individualized CNTs may also be carried out on the CNS. In addition, some of the attractive properties often associated with using CNTs also are displayed in materials that incorporate CNSs. These include, for example, electrical conductivity, attractive physical properties including good tensile strength when integrated into a composite, such as a thermoplastic or thermoset compound, thermal stability (sometimes comparable to that of diamond crystals or in-plane graphite sheets) and/or chemical stability, to name a few.

However, as used herein, the term "CNS" is not a synonym for individualized, un-entangled structures such as "monomeric" fullerenes (the term "fullerene" broadly referring to an allotrope of carbon in the form of a hollow sphere, ellipsoid, tube, e.g., a carbon nanotube, and other shapes). In fact, many embodiments of the invention highlight differences and advantages observed or anticipated with the use of CNSs as opposed to the use of their CNTs building blocks. Without wishing to be held to a particular interpretation, it is believed that the combination of branching, crosslinking, and wall sharing among the carbon nanotubes in a CNS reduces or minimizes the van der Waals forces that are often problematic when using individual carbon nanotubes in a similar manner.

In addition, or alternatively to performance attributes, CNTs that are part of or are derived from a CNS can be characterized by a number of features, at least some of which can be relied upon to distinguish them from other nanomaterials, such as, for instance, ordinary CNTs (namely CNTs that are not derived from CNSs and can be provided as individualized, pristine or fresh CNTs).

In many cases, a CNT present in or derived from a CNS has a typical diameter of 100 nanometers (nm) or less, such as, for example, within the range of from about 5 to about 100 nm, e.g., within the range of from about 10 to about 75, from about 10 to about 50, from about 10 to about 30, from about 10 to about 20 nm.

In specific embodiments, at least one of the CNTs has a length that is equal to or greater than 2 microns, as determined by SEM. For example, at least one of the CNTs will have a length within a range of from 2 to 2.25 microns; from 2 to 2.5 microns; from 2 to 2.75 microns; from 2 to 3.0 microns; from 2 to 3.5 microns; from 2 to 4.0 microns; or from 2.25 to 2.5 microns; from 2.25 to 2.75 microns; from 2.25 to 3 microns; from 2.25 to 3.5 microns; from 2.25 to 4 microns; or from 2.5 to 2.75 microns; from 2.5 to 3 microns; from 2.5 to 3.5 microns; from 2.5 to 4 microns; or from 3 to 3.5 microns; from 3 to 4 microns; of from 3.5 to 4 microns or higher. In some embodiments, more than one, e.g., a portion such as a fraction of at least about 0.1%, at least about 1%, at least about 10%, at least about 15%, at least about 20%, at least about 25%, at least about 30%, at least about 35%, at least about 40, at least about 45%, at least about 50% or even more than one half, of the CNTs, as determined by SEM, can have a length greater than 2 microns, e.g., within the ranges specified above.

The morphology of CNTs present in a CNS, in a fragment of a CNS or in a fractured CNT derived from a CNS will often be characterized by a high aspect ratio, with lengths typically more than 100 times the diameter, and in certain cases much higher. For instance, in a CNS (or CNS fragment), the length to diameter aspect ratio of CNTs can be within a range of from about 200 to about 1000, such as, for instance, from 200 to 300; from 200 to 400; from 200 to 500; from 200 to 600; from 200 to 700; from 200 to 800; from 200 to 900; or from 300 to 400; from 300 to 500; from 300 to 600; from 300 to 700; from 300 to 800; from 300 to 900; from 300 to 1000; or from 400 to 500; from 400 to 600; from 400 to 700; from 400 to 800; from 400 to 900; from 400 to 1000; or from 500 to 600; from 500 to 700; from 500 to 800; from 500 to 900; from 500 to 1000; or from 600 to 700; from 600 to 800; from 600 to 900; from 600 to 1000; from 700 to 800; from 700 to 900; from 700 to 1000; or from 800 to 900; from 800 to 1000; or from 900 to 1000.

It has been found that in CNSs, as well as in structures derived from CNSs (e.g., in fragments of CNSs or in fractured CNTSs) at least one of the CNTs is characterized by a certain "branch density". As used herein, the term "branch" refers to a feature in which a single carbon nanotube diverges into multiple (two or more), connected multiwall carbon nanotubes. One embodiment has a branch density according to which, along a two-micrometer length of the carbon nanostructure, there are at least two branches, as determined by SEM. Three or more branches also can occur Further features (detected using TEM or SEM, for example) can be used to characterize the type of branching found in CNSs relative to structures such as Y-shaped CNTs that are not derived from CNSs. For instance, whereas Y-shaped CNTs, have a catalyst particle at or near the area (point) of branching, such a catalyst particle is absent at or near the area of branching occurring in CNSs, fragments of CNSs or fractured CNTs.

In addition, or in the alternative, the number of walls observed at the area (point) of branching in a CNS, fragment of CNS or fractured CNTs, differ from one side of the branching (e.g., before the branching point) to the other side of this area (e.g., after or past the branching point). Such a change in in the number of walls, also referred to herein as an "asymmetry" in the number of walls, is not observed with ordinary Y-shaped CNTs (where the same number of walls is observed in both the area before and the area past the branching point).

Figure 1B:
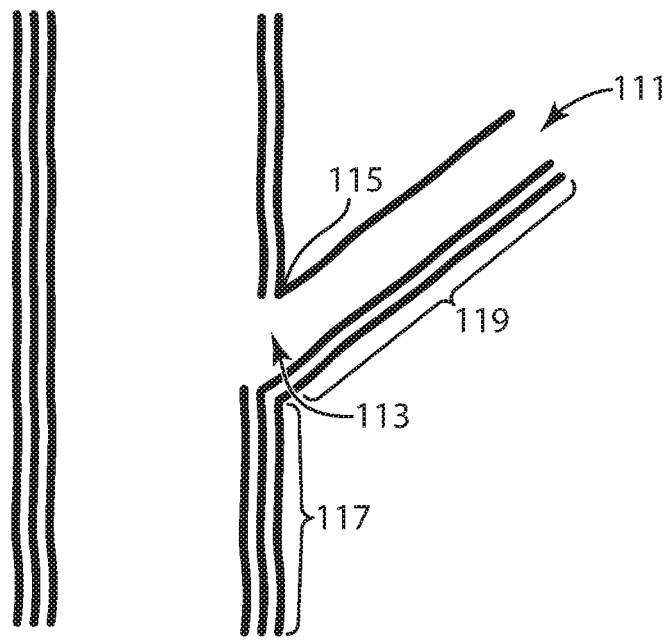

Diagrams illustrating these features are provided in FIGS. 1A and 1B. Shown in FIG. 1A, is an exemplary Y-shaped CNT 11 that is not derived from a CNS. Y-shaped CNT 11 includes catalyst particle 13 at or near branching point 15. Areas 17 and 19 are located, respectively, before and after the branching point 15. In the case of a Y-shaped CNT such as Y-shaped CNT 11, both areas 17 and 19 are characterized by the same number of walls, i.e., two walls in the drawing.

In contrast, in a CNS (FIG. 1B), a CNT building block 111, that branches at branching point 115, does not include a catalyst particle at or near this point, as seen at catalyst devoid region 113. Furthermore, the number of walls present in region 117, located before, prior (or on a first side of) branching point 115 is different from the number of walls in region 119 (which is located past, after or on the other side relative to branching point 115. In more detail, the three-walled feature found in region 117 is not carried through to region 119 (which in the diagram of FIG. 1B has only two walls), giving rise to the asymmetry mentioned above.

Figure 2A:
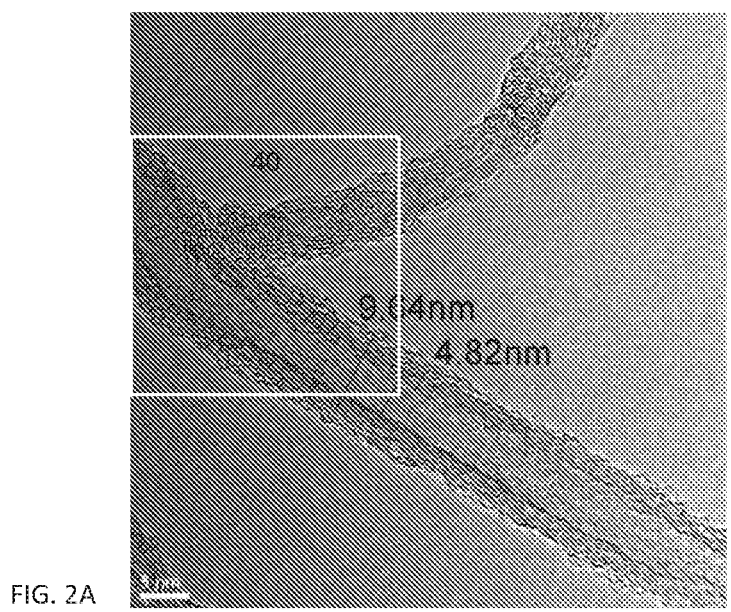
FIGS. 2A and 2B are TEM images showing features characterizing multiwall carbon nanotubes found in carbon nanostructures.
Figure 2B:
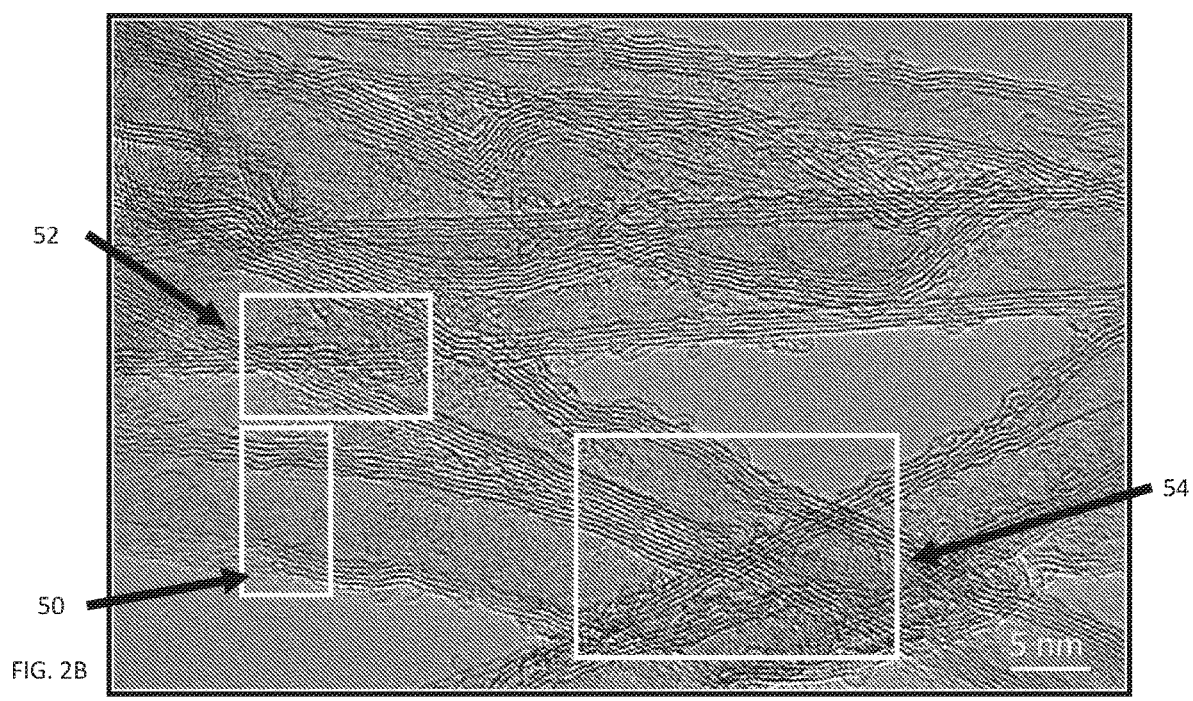
Figure 2C:
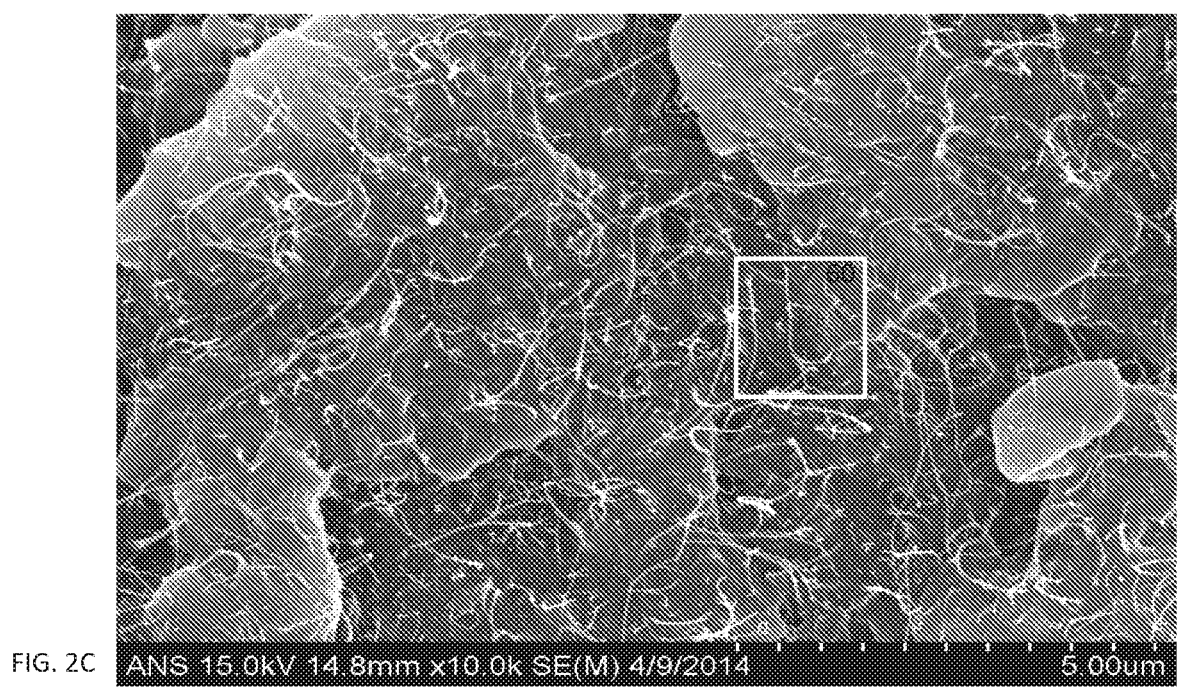
FIGS. 2C and 2D are SEM images of carbon nanostructures showing the presence of multiple branches.
Figure 2D:
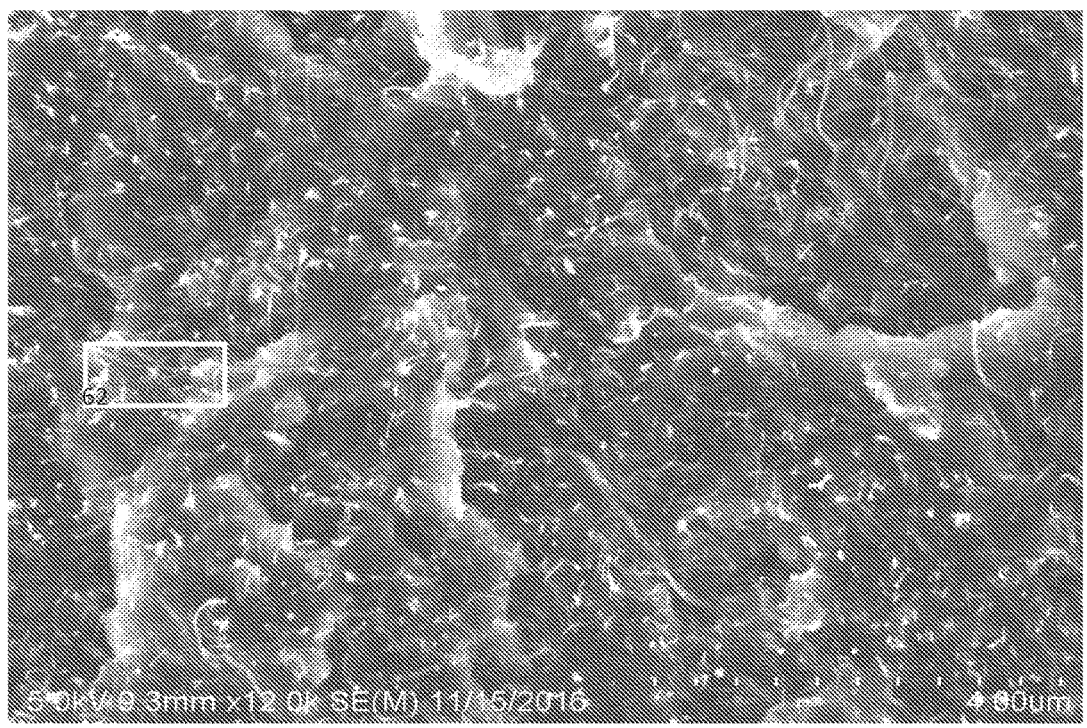

These features are highlighted in the TEM images of FIGS. 2A and 2B and SEM images of FIGS. 2C and 2D.

In more detail, the CNS branching in TEM region 40 of FIG. 2A shows the absence of any catalyst particle. In the TEM of FIG. 2B, first channel 50 and second channel 52 point to the asymmetry in the number of walls featured in branched CNSs, while arrow 54 points to a region displaying wall sharing. Multiple branches are seen in the SEM regions 60 and 62 of FIGS. 2C and 2D, respectively.

One, more, or all these attributes can be encountered in the compositions (e.g., dispersions, slurries, pastes, solid or dried compositions, etc.), electrodes and/or batteries described herein.

In some embodiments, the CNS is present as part of an entangled and/or interlinked network of CNSs. Such an interlinked network can contain bridges between CNSs.

Suitable techniques for preparing CNSs are described, for example, in U.S. Patent Application Publication No. 2014/0093728 A1, published on Apr. 3, 2014, U.S. Pat. Nos. 8,784,937B2; 9,005,755B2; 9,107,292B2; and 9,447,259B2. The entire contents of these documents are incorporated herein by this reference.

As described in these documents, a CNS can be grown on a suitable substrate, for example on a catalyst-treated fiber material. The product can be a fiber-containing CNS material. In some cases, the CNSs is separated from the substrate to form flakes.

As seen in US 2014/0093728A1 a carbon nanostructure obtained as a flake material (i.e., a discrete particle having finite dimensions) exists as a three-dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the CNS can be modulated to some degree by adjusting the carbon nanostructure growth conditions, including, for example, by changing the concentration of transition metal nanoparticle catalyst particles that are disposed on the growth substrate to initiate carbon nanotube growth.

The flakes can be further processed, e.g., by cutting or fluffing (operations that can involve mechanical ball milling, grinding, blending, etc.), chemical processes, or any combination thereof.

In some embodiments, the CNSs employed are "coated", also referred to herein as "sized" or "encapsulated" CNSs. In a typical sizing process, the coating is applied onto the CNTs that form the CNS. The sizing process can form a partial or a complete coating that is non-covalently bonded to the CNTs and, in some cases, can act as a binder. In addition, or in the alternative, the size can be applied to already formed CNSs in a post-coating (or encapsulation) process. With sizes that have binding properties, CNSs can be formed into larger structures, granules or pellets, for example. In other embodiments the granules or pellets are formed independently of the function of the sizing.

Coating amounts can vary. For instance, relative to the overall weight of the coated CNS material, the coating can be within the range of from about 0.1 weight % to about 10 weight % (e.g., within the range, by weight, of from about 0.1% to about 0.5%; from about 0.5% to about 1%; from about 1% to about 1.5%; from about 1.5% to about 2%; from about 2% to about 2.5%; from about 2.5% to about 3%; from about 3% to about 3.5%; from about 3.5% to about 4%; from about 4% to about 4.5%; from about 4.5% to about 5%; from about 5% to about 5.5%; from about 5.5% to about 6%; from about 6% to about 6.5%; from about 6.5% to about 7%; from about 7% to about 7.5%; from about 7.5% to about 8%; from about 8% to about 8.5%; from about 8.5% to about 9%; from about 9% to about 9.5%; or from about 9.5% to about 10%.

In many cases, controlling the amount of coating (or size) reduces or minimizes undesirable effects on the properties of the CNS material itself. Low coating levels, for instance, are more likely to preserve electrical properties brought about by the incorporation of CNSs or CNS-derived (e.g., CNS fragments of fractured CNTs) materials in a cathode composition.

Various types of coatings can be selected. In many cases, sizing solutions commonly used in coating carbon fibers or glass fibers could also be utilized to coat CNSs. Specific examples of coating materials include but are not limited to fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. In many implementations, the CNSs used are treated with a polyurethane (PU), a thermoplastic polyurethane (TPU), or with polyethylene glycol (PEG).

Polymers such as, for instance, epoxy, polyester, vinylester, polyetherimide, polyetherketoneketone, polyphthalamide, polyetherketone, polyetheretherketone, polyimide, phenol-formaldehyde, bismaleimide, acrylonitrile-butadiene styrene (ABS), polycarbonate, polyethyleneimine, polyurethane, polyvinyl chloride, polystyrene, polyolefins, polypropylenes, polyethylenes, polytetrafluoroethylene, elastomers such as, for example, polyisoprene, polybutadiene, butyl rubber, nitrile rubber, ethylene-vinyl acetate polymers, silicone polymers, and fluorosilicone polymers, combinations thereof, or other polymers or polymeric blends can also be used in some cases. In order to enhance electrical conductivity, conductive polymers such as, for instance, polyanilines, polypyrroles and polythiophenes can also be used.

Some implementations employ coating materials that can assist in stabilizing a CNS dispersion in a solvent. In one example, the coating is selected to facilitate and/or stabilize dispersing CNSs in a medium that comprises, consists essentially of or consists of N-methylpyrrolidone (NMP), acetone, a suitable alcohol, water or any combination thereof.

Many embodiments described herein use CNS-materials that have a 97% or higher CNT purity. Typically, anionic, cationic or metal impurities are very low, e.g., in the parts per million (ppm) range. Often, the CNSs used herein require no further additives to counteract Van der Waals' forces.

CNSs can be provided in the form of a loose particulate material (as CNS flakes, granules, pellets, etc., for example) or in formulations that also include a liquid medium, e.g., dispersions, slurries, pastes, or in other forms. In many implementations, the CNSs employed are free of any growth substrate.

Figure 3A:
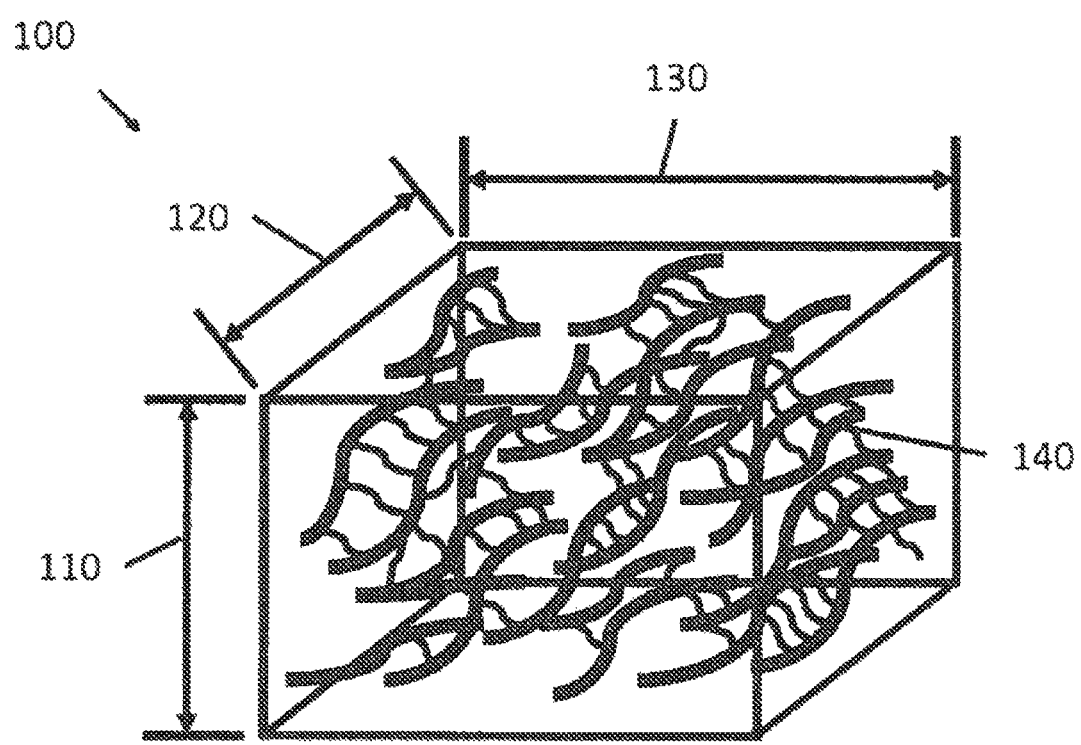
FIG. 3A is an illustrative depiction of a carbon nanostructure flake material after isolation of the carbon nanostructure from a growth substrate.

In some embodiments, the CNSs are provided in the form of a flake material after being removed from the growth substrate upon which the carbon nanostructures are initially formed. As used herein, the term "flake material" refers to a discrete particle having finite dimensions. Shown in FIG. 3A, for instance, is an illustrative depiction of a CNS flake material after isolation of the CNS from a growth substrate. Flake structure 100 can have first dimension 110 that is in a range from about 1 nm to about 35 μm thick, particularly about 1 nm to about 500 nm thick, including any value in between and any fraction thereof. Flake structure 100 can have second dimension 120 that is in a range from about 1 micron to about 750 microns tall, including any value in between and any fraction thereof. Flake structure 100 can have third dimension 130 that can be in a range from about 1 micron to about 750 microns, including any value in between and any fraction thereof. Two or all of dimensions 110, 120 and 130 can be the same or different.

For example, in some embodiments, second dimension 120 and third dimension 130 can be, independently, on the order of about 1 micron to about 10 microns, or about 10 microns to about 100 microns, or about 100 microns to about 250 microns, from about 250 to about 500 microns, or from about 500 microns to about 750 microns.

CNTs within the CNS can vary in length from about 10 nanometers (nm) to about 750 microns (μm), or higher. Thus, the CNTs can be from 10 nm to 100 nm, from 10 nm to 500 nm; from 10 nm to 750 nm; from 10 nm to 1 micron; from 10 nm to 1.25 micron; from 10 nm to 1.5 micron; from 10 nm to 1.75 micron; from 10 nm to 2 micron; or from 100 nm to 500 nm, from 100 nm to 750 nm; from 100 nm to 1 micron; from 100 to 1.25 micron; from 100 to 1.5 micron; from 100 to 1.75 micron from 100 to 2 microns; from 500 nm to 750 nm; from 500 nm to 1 micron; from 500 nm to 1 micron; from 500 nm to 1.25 micron; from 500 nm to 1.5 micron; from 500 nm to 1.75 micron; from 500 nm to 2 micron; from 750 nm to 1 micron; from 750 nm to 1.25 micron; from 750 nm to 1.5 micron; from 750 nm to 1.75 microns; from 750 nm to 2 microns; from 1 micron to 1.25 micron; from 1.0 micron to 1.5 micron; from 1 micron to 1.75 micron; from 1 micron to 2 microns; or from 1.25 micron to 1.5 micron; from 1.25 micron to 1.75 micron; from 1 micron to 2 microns; or from 1.5 to 1.75 micron; from 1.5 to 2 micron; or from 1.75 to 2 microns.

In specific embodiments, at least one of the CNTs has a length that is equal to or greater than 2 microns, as determined by SEM. For example, at least one of the CNTs will have a length within a range of from 2 to 2.25 microns; from 2 to 2.5 microns; from 2 to 2.75 microns; from 2 to 3.0 microns; from 2 to 3.5 microns; from 2 to 4.0 microns; or from 2.25 to 2.5 microns; from 2.25 to 2.75 microns; from 2.25 to 3 microns; from 2.25 to 3.5 microns; from 2.25 to 4 microns; or from 2.5 to 2.75 microns; from 2.5 to 3 microns; from 2.5 to 3.5 microns; from 2.5 to 4 microns; or from 3 to 3.5 microns; from 3 to 4 microns; of from 3.5 to 4 microns or higher.

Figure 3B:
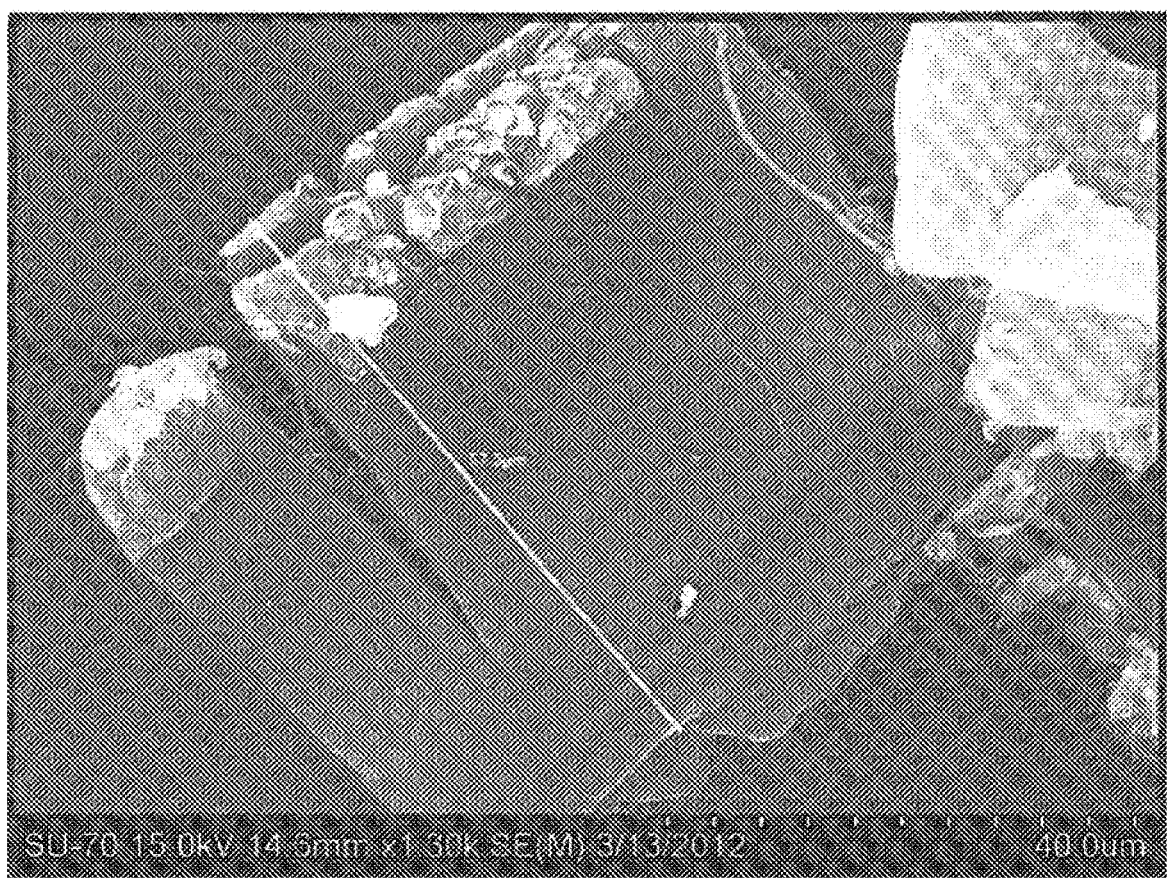
FIG. 3B is a SEM image of an illustrative carbon nanostructure obtained as a flake material.

Shown in FIG. 3B is a SEM image of an illustrative carbon nanostructure obtained as a flake material. The carbon nanostructure shown in FIG. 3B exists as a three-dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the carbon nanostructure can be modulated to some degree by adjusting the carbon nanostructure growth conditions, including, for example, by changing the concentration of transition metal nanoparticle catalyst particles that are disposed on the growth substrate to initiate carbon nanotube growth.

A flake structure can include a webbed network of carbon nanotubes in the form of a carbon nanotube polymer (i.e., a "carbon nanopolymer") having a molecular weight in a range from about 15,000 g/mol to about 150,000 g/mol, including all values in between and any fraction thereof. In some cases, the upper end of the molecular weight range can be even higher, including about 200,000 g/mol, about 500,000 g/mol, or about 1,000,000 g/mol. The higher molecular weights can be associated with carbon nanostructures that are dimensionally long. The molecular weight can also be a function of the predominant carbon nanotube diameter and number of carbon nanotube walls present within the carbon nanostructure. The crosslinking density of the carbon nanostructure can range between about 2 mol/cm$^3$ to about 80 mol/cm$^3$. Typically, the crosslinking density is a function of the carbon nanostructure growth density on the surface of the growth substrate, the carbon nanostructure growth conditions and so forth. It should be noted that the typical CNS structure, containing many, many CNTs held in an open web-like arrangement, removes Van der Wall's forces or diminishes their effect. This structure can be exfoliated more easily, which makes many additional steps of separating them or breaking them into branched structures unique and different from ordinary CNTs.

With a web-like morphology, carbon nanostructures can have relatively low bulk densities. As-produced carbon nanostructures can have an initial bulk density ranging between about 0.003 g/cm$^3$ to about 0.015 g/cm$^3$. Further consolidation and/or coating to produce a carbon nanostructure flake material or like morphology can raise the bulk density to a range between about 0.1 g/cm$^3$ to about 0.15 g/cm$^3$. In some embodiments, optional further modification of the carbon nanostructure can be conducted to further alter the bulk density and/or another property of the carbon nanostructure. In some embodiments, the bulk density of the carbon nanostructure can be further modified by forming a coating on the carbon nanotubes of the carbon nanostructure and/or infiltrating the interior of the carbon nanostructure with various materials. Coating the carbon nanotubes and/or infiltrating the interior of the carbon nanostructure can further tailor the properties of the carbon nanostructure for use in various applications. Moreover, forming a coating on the carbon nanotubes can desirably facilitate the handling of the carbon nanostructure. Further compaction can raise the bulk density to an upper limit of about 1 g/cm$^3$, with chemical modifications to the carbon nanostructure raising the bulk density to an upper limit of about 1.2 g/cm$^3$.

In addition to the flakes described above, the CNS material can be provided as granules, pellets, or in other forms of loose particulate material, having a typical particle size within the range of from about 1 mm to about 1 cm, for example, from about 0.5 mm to about 1 mm, from about 1 mm to about 2 mm, from about 2 mm to about 3 mm, from about 3 mm to about 4 mm, from about 4 mm to about 5 mm, from about 5 mm to about 6 mm, from about 6 mm to about 7 mm, from about 7 mm to about 8 mm, from about 8 mm to about 9 mm or from about 9 mm to about 10 mm.

Bulk densities characterizing CNS materials that can be employed can be within the range of from about 0.005 g/cm$^3$ to about 0.1 g/cm$^3$, e.g., from about 0.01 g/cm$^3$ to about 0.05 g/cm$^3$.

Commercially, examples of CNS materials that can be utilized are those developed by Applied Nanostructured Solutions, LLC (ANS) (Massachusetts, United States).

The CNSs used herein can be identified and/or characterized by various techniques. Electron microscopy, including techniques such as transmission electron microscopy (TEM) and scanning electron microscopy (SEM), for example, can provide information about features such as the frequency of specific number of walls present, branching, the absence of catalyst particles, etc. See, e.g., FIGS. 2A-2D.

Raman spectroscopy can point to bands associated with impurities. For example, a D-band (around 1350 cm$^{-1}$) is associated with amorphous carbon; a G band (around 1580 cm$^{-1}$) is associated with crystalline graphite or CNTs). A G' band (around 2700 cm$^{-1}$) is expected to occur at about 2× the frequency of the D band. In some cases, it may be possible to discriminate between CNS and CNT structures by thermogravimetric analysis (TGA).

In some embodiments, the CNSs are utilized in conjunction with another CCA, such as, for instance, CB and/or individualized, pristine CNTs, i.e., CNTs that are not generated or derived from CNSs, e.g., during processing.

In many cases, the CB particles employed have a Brunauer-Emmett-Teller (BET) surface area no greater than about 200, 180, 160, 140, 120, 100, 80, 60 or 50 m$^2$/g. In specific examples, the CB particles have a BET that is within the range of from about 200 to about 180 m$^2$/g; from about 200 to about 160 m$^2$/g; 200 to about 140 m$^2$/g; from about 200 to about 120 m$^2$/g; from about 200 to about 100 m$^2$/g, from about 200 to about 80 m$^2$/g; from about 200 to about 60 m$^2$/g; from about 200 to about 50 m$^2$/g; or from about 180 to about 160 m$^2$/g; from about 180 to about 140 m$^2$/g; from about 180 to about 120 m$^2$/g; from about 180 to about 100 m$^2$/g, from about 180 to about 80 m$^2$/g; from about 180 to about 60 m$^2$/g; from about 180 to about 50 m$^2$/g; or from about 160 to about 140 m$^2$/g; from about 160 to about 120 m$^2$/g; from about 160 to about 100 m$^2$/g, from 160 to about 80 m$^2$/g; from about 160 to about 60 m$^2$/g; from 160 to about 50 m$^2$/g; or from about 140 to about 120 m$^2$/g; or from about 140 to about 100 m$^2$/g, from 140 to about 80 m$^2$/g; from about 140 to about 60 m$^2$/g; from about 140 to about 50 m$^2$/g; or from about 120 to about 100 m$^2$/g, from 120 to about 80 m$^2$/g; from about 120 to about 60 m$^2$/g; from 120 to about 50 m$^2$/g; or from about 100 to about 80 m$^2$/g; from about 100 to about 60 m$^2$/g; from 100 to about 50 m$^2$/g; or from about 80 to about 60 m$^2$/g; from 80 to about 50 m$^2$/g; or from about 60 to about 50 m$^2$/g. All BET surface area values disclosed herein refer to "BET nitrogen surface area" and are determined by ASTM D6556-10, the entirety of which is incorporated herein by reference.

Suitable CBs can have an oil adsorption number (OAN) of at least 130 mL/100 g, 140, 150, 160, 170, 180, 190, 200, 210, 220, 230, 240 or 250 mL/100 g. Exemplary CBs have an OAN within the range of from about 130 to about 150 mL/100 g; from about 130 to about 170 mL/100 g; from about 130 to about 190 mL/100 g; from about 130 to about 210 mL/100 g; from about 130 to about 230 mL/100 g; from 130 to about 250 mL/100 g or higher; or from about 150 to about 170 from about 150 to about 190; from about 150 to about 210; from about 150 to about 230 mL/100 g; from about 150 to about 250 mL/100 g or higher; or from 170 to about 190 mL/100 g; from about 170 to about 210; from about 170 to about 230 mL/100 g; from about 170 to about 250 mL/100 g or higher; or from about 190 to about 210 mL/100 g; from about 190 to about 230 mL/100 g; from about 190 to about 250 mL/100 g or higher; or from about 210 to about 230 mL/100 g; from about 210 to about 250 mL/100 g or higher; or from about 230 to about 250 mL/100 g or higher. All OAN values cited herein are determined by the method described in ASTM D 2414-16.

Carbon black particles also can be characterized by their statistical thickness surface areas (STSAs), a property that can be determined by ASTM D 6556-10. For a given carbon black, it may also be of interest, in some cases, to specify the ratio of its STSA to its BET surface area (STSA:BET ratio).

For the purpose of this application, the STSA:BET ratio for carbon black particles can be within the range of about 0.3 to about 1.

Crystalline domains can be characterized by an $L_a$ crystallite size, as determined by Raman spectroscopy. $L_a$ is defined as 43.5×(area of G band/area of D band). The crystallite size can give an indication of the degree of graphitization, where a higher $L_a$ value correlates with a higher degree of graphitization. Raman measurements of $L_a$ were based on Gruber et al., "Raman studies of heat-treated carbon blacks," *Carbon* Vol. 32 (7), pp. 1377-1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon, and the G band to graphitic or "ordered' sp$^2$ carbon. Using an empirical approach, the ratio of the G/D bands and an $L_a$ measured by X-ray diffraction (XRD) are highly correlated, and regression analysis gives the empirical relationship:

$$L_a = 43.5 \times (\text{area of } G \text{ band/area of } D \text{ band}),$$

in which $L_a$ is calculated in Angstroms. Thus, a higher $L_a$ value corresponds to a more ordered crystalline structure.

In some embodiments, the carbon black has an $L_a$ crystallite size of less than or equal to 35 Å, for example, from 25 Å to 35 Å. The $L_a$ crystallite size can have or include, for example, one of the following ranges: from 25 to 33 Å, or from 25 to 31 Å, or from 25 to 29 Å, or from 25 to 27 Å, or from 27 to 35 Å, or from 27 to 33 Å, or from 27 to 31 Å, or from 27 to 29 Å, or from 29 to 35 Å, or from 29 to 33 Å, or from 29 to 31 Å, or from 31 to 35 Å, or from 31 to 33 Å, or from 33 to 35 Å. In certain embodiments, the $L_a$ crystallite size can be less than or equal to 33 Å, or less than or equal to 31 Å, or less than or equal to 29 Å, or less than or equal to 27 Å.

The crystalline domains can be characterized by an $L_c$ crystallite size. The $L_c$ crystallite size was determined by X-ray diffraction using an X-ray diffractometer (PANalytical X'Pert Pro, PANalytical B.V.), with a copper tube, tube voltage of 45 kV, and a tube current of 40 mA. A sample of carbon black particles was packed into a sample holder (an accessory of the diffractometer), and measurement was performed over angle (2θ) range of 10° to 80°, at a speed of 0.14°/min. Peak positions and full width at half maximum values were calculated by means of the software of the diffractometer. For measuring-angle calibration, lanthanum hexaboride (LaB$_6$) was used as an X-ray standard. From the measurements obtained, the $L_c$ crystallite size was determined using the Scherrer equation: $L_c$ (Å)=K*λ/(β*cos θ), where K is the shape factor constant (0.9); λ is the wavelength of the characteristic X-ray line of Cu K$_{\alpha 1}$ (1.54056 Å); β is the peak width at half maximum in radians; and θ is determined by taking half of the measuring angle peak position (2θ).

In some embodiments, the carbon black has an $L_c$ crystallite size of less than or equal to 27 Å, for example, from 15 Å to 27 Å. The $L_c$ crystallite size can have or include, for example, one of the following ranges: from 15 to 25 Å, or from 15 to 23 Å, or from 15 to 21 Å, or from 15 to 19 Å, or from 15 to 17 Å, or from 17 to 27 Å, or from 17 to 25 Å, or from 17 to 23 Å, or from 17 to 21 Å, or from 17 to 19 Å, or from 19 to 27 Å, or from 19 to 25 Å, or from 19 to 23 Å, or from 19 to 21 Å, or from 21 to 27 Å, or from 21 to 25 Å, or from 21 to 23 Å, or from 23 to 27 Å, or from 23 to 25 Å, or from 25 to 27 Å. In certain embodiments, the $L_c$ crystallite size can be less than or equal to 25 Å, or less than or equal to 23 Å, or less than or equal to 21 Å, or less than or equal to 19 Å, or less than or equal to 17 Å.

The carbon black particles can have a high degree of graphitization, as indicated by a high % crystallinity, which is obtained from Raman measurements as a ratio of the area of the G band and the areas of G and D bands ($I_G/I_{G+D}$). In certain embodiments, the carbon black particles have % crystallinities ($I_G/I_{G+D}$) ranging from about 25% to about 45%, as determined by Raman spectroscopy. The % crystallinity ($I_G/I_{G+D}$) can have or include, for example, one of the following ranges: from 25% to 43%, from 25% to 41%, from 25% to 37%, from 25% to 39%, from 25% to 35%, from 25% to 30%, from 25% to 28%; or from 30% to 45%, from 30% to 43%, from 30% to 39%, from 30% to 35%; or from 35% to 45%, from 35% to 41%, from 35% to 39%; or from 37% to 45%, from 37% to 43%, from 37% to 41%; or from 39% to 45%, from 39% to 43%; or from 41% to 45%, or from 41% to 43%.

Some CB specifications characterized by these and/or other properties known and recognized by those skilled in the art are shown as specifications A-F in Table 1.

TABLE 1

| CB Specification | BET SA, $m^2/g$ | STSA, $m^2/g$ | OAN, mL/100 g | $L_a$ Raman Å | ($I_G/(I_G + I_D)$) % Cr, Raman | $L_c$ XRD Å |
| --- | --- | --- | --- | --- | --- | --- |
| A | 154 | 135 | 161 | 31 | 42 | 21 |
| B | 169 | 144 | 155 | 24 | 38 | 19 |
| C | 100 | 100 | 250 | 27 | 39 | 21 |
| D | 58 | 58 | 200 | 28 | 39 | 20 |
| E | 390 | 145 | 170 | 19 | 30 | 14 |
| F | 55 | 55 | 140 | 17 | 28 | 15 |

Suitable CB particles that can be utilized can be commercially available particles. Examples include LITX® 50, LITX® 66, LITX® 200, LITX® 300, LITX® HP and Vulcan® 500 carbon black particles available from Cabot Corporation; C-NERGY™ C45, C-NERGY™ C65 and SUPER P® products from Imerys; Li-400, Li-250, Li-100 and Li-435 products from Denka; and the EC300 product from Ketjen.

Other materials that could be used in conjunction with CNSs are illustrated by specification L-N (Table 2, below) describing exemplary CNTs:

TABLE 2

| CB Specification | BET SA, $m^2/g$ | STSA, $m^2/g$ | OAN, mL/100 g | $L_a$ Raman Å | ($I_G/(I_G + I_D)$) % Cr, Raman | $L_c$ XRD Å |
| --- | --- | --- | --- | --- | --- | --- |
| L | 230 | N/A | N/A | 52.5 | 55 | 45 |
| M | 170 | N/A | N/A | 30 | 40 | 41 |
| N | 191 | N/A | N/A | 56 | 55 | 31 |

Values presented in Table 2 are typically determined using the techniques described above with respect to CB.

In many situations, the CNS material (in the form of flakes, pellets, granules, for instance) is provided in combination with or in the presence of a liquid medium. In general, the liquid medium can be any liquid, a solvent, for instance, that is suitable for use with the constituents of the compositions described herein and capable of being used to manufacture the intended electrode. The solvent can be anhydrous, polar and/or aprotic. In some embodiments, the solvent has a high volatility so that, during manufacturing, it can be easily removed (e.g., evaporated), thereby reducing drying time and production costs. Suitable examples include but are not limited to N-methylpyrrolidone (NMP), acetone, a suitable alcohol, water or any combination thereof.

In some cases, the composition further includes one or more dispersants (e.g., a cellulosic dispersant), and/or one or more additives, typically electrically non-conductive additives, such as a maleic anhydride polymer, for example.

The dispersant generally includes a material capable of facilitating the dispersion of the CNSs in the solvent (e.g., via a steric hindrance mechanism and/or an electrostatic charge mechanism), while keeping the viscosity of the compositions sufficiently low to enable practical processing of the compositions, e.g., for the manufacturing of electrodes for batteries. In some embodiments, for compositions including the CNSs, the dispersant, the polymer and the solvent have a viscosity of equal to or less than 200 centipoise (cP) at a shear rate of 450 s$^{-1}$, for example, at least 30 cP at a shear rate of 450 s$^{-1}$, or from 50 cP to 140 cP at a shear rate of 450 s$^{-1}$, as determined by rheometer. In various embodiments, the composition can be described as a slurry or a paste that can be readily applied or coated to a conductive substrate to form an electrode, as contrasted with a mud that is too thick or viscous to be efficiently applied during manufacturing. In addition to its ability to disperse the CNS material, the dispersant preferably is thermally stable, is electrochemically inert, and/or interferes minimally with the electrical conductivity of CNS material. A thermally stable or non-volatile dispersant allows the solvent (e.g., N-methylpyrrolidone, water or others) to be removed and recycled during electrode manufacturing without removing and/or degrading the dispersant. "Electrochemically inert" means that the dispersant is stable during normal use of the battery (e.g., does not degrade or oxidize at or below the operating voltages of the battery) since such degradation can negatively affect the performance of the battery. Furthermore, since the dispersant coats at least portions of the CNS flakes, granules, pellets, etc. to disperse the particles, the dispersant will interfere with or reduce the conductive contact surfaces available to the particles. It is preferable to select a dispersant that minimally interferes with the electrical conductivity of the CNS particles. Examples of suitable dispersants include poly(vinyl pyrrolidone), poly(vinylpyrrolidone-co-vinyl acetate), poly(vinyl butyral), poly(vinyl alcohol), poly(ethylene oxide), poly (propylene oxide), poly(propylene carbonate), cellulosic dispersants such as methyl cellulose, carboxymethyl cellulose, ethyl cellulose, hydroxymethyl cellulose and hydroxypropyl cellulose; poly(carboxylic acid) such as poly (acrylic acid), polyacrylate, poly(methylacrylate), poly(acrylamide), amide wax, styrene maleic anhydride resins, octylphenol ethoxylate and others known in the art. The compositions can include one composition of dispersants or multiple, different compositions of dispersants.

The concentration of the dispersant in the compositions can vary, depending on the composition(s) of the dispersant used, and the specific type(s) and concentrations of CNS, the polymer, and the solvent. In some embodiments, the concentration of the dispersant is best expressed as a ratio of the dispersant to the CNS material, by weight. This weight ratio can range from 3:100 to 50:100 and can have or include, for example, one of the following ranges: 3:100 to 40:100, or 3:100 to 30:100, or 3:100 to 20:100, or 3:100 to 10:100, or 10:100 to 50:100, or 10:100 to 40:100, or 10:100 to 30:100, or 10:100 to 20:100, or 20:100 to 50:100, or 20:100 to 40:100, or 20:100 to 30:100, or 30:100 to 50:100, or 30:100 to 40:100, or 40:100 to 50:100.

The CNS material can be combined with the liquid, optionally in the presence of a dispersant, by a suitable mixing technique, using, for example, conventional mixing equipment. In specific embodiments, the constituents are blended to form a composition, a solution or dispersion, for example. The composition can be characterized, for instance, by a concentration of CNS in the solvent of from about 0.25 to about 5 weight %, e.g., from about 0.25 to about 2.5 wt % or more. In illustrative examples, the concentration in wt % is within a range of from about 0.25 to about 0.5, from about 0.5 to about 0.75, from about 0.75 to about 1.0, from about 1.0 to about 1.25, from about 1.25 to about 1.50, from about 1.50 to about 1.75, from about 1.75 to about 2.0, from about 2.0 to about 2.25, from about 2.25 to about 2.5, from about 2.5 to about 2.75, from about 2.75 to about 3.0, from about 3.0 to about 3.25, from about 3.25 to about 3.5, from about 3.5 to about 3.75, from about 3.75 to about 4.0, from about 4.0 to about 4.25, from about 4.25 to about 4.5, from about 4.5 to about 4.75, or from about 4.75 to about 5. Other concentrations of CNS in solvent can be employed.

Unlike ordinary solutions or dispersions that use ordinary, individualized CNTs, e.g., in pristine form, CNSs, in particular when provided as post-coated CNSs in the form of granules or pellets, can yield stable dispersions. In some embodiments, stable dispersions can be achieved in the absence of stabilizing surfactants, even with water as solvent. Other embodiments utilize a solvent in combination with water during wet processing. Examples of solvents that can be used include, but are not limited to, isopropanol (IPA), ethanol, methanol, and water.

In some cases, techniques used to prepare the dispersion generate CNS-derived species such as "CNS fragments" and/or "fractured CNTs" that become distributed (e.g., homogeneously) in individualized form throughout the dispersion. Except for their reduced sizes, CNS fragments (a term that also includes partially fragmented CNSs) generally share the properties of intact CNS and can be identified by electron microscopy and other techniques, as described above. Fractured CNTs can be formed when crosslinks between CNTs within the CNS are broken, under applied shear, for example. Derived (generated or prepared) from CNSs, fractured CNTs are branched and share common walls with one another.

A composition consisting of or consisting essentially of a CNS material or a composition prepared from CNSs, e.g., a dispersion such as described above, is combined with other ingredients. It can be used, for instance, in the production of any number of energy storage devices, such as lithium-ion batteries. As an example, the composition is employed to produce an electrode (e.g., an anode) composition for a lithium-ion battery. For instance, the composition can be combined with an electroactive material (component) specific to a particular type of anode.

In many implementations, the active anode material is graphite, e.g., natural graphite, artificial graphite or blends of both. Commercially available types of graphite that can be used include mesocarbon microbead (MCMB), mesophase-pitch-based carbon fiber (MCF), vapor grown carbon fibre (VGCF), massive artificial graphite (MAG), natural graphite and others. In other implementations, the active anode compound used comprises, consists essentially of or consists of silicon. In one example, the active anode material is a silicon-graphite composite, a graphite containing nanosilicon (Si) or $SiO_x$ particles.

Principles described herein also can be used with other active anode materials such as, for instance, those known or currently explored, or those to be developed in the future. Examples include but are not limited to: (a) intercalation/de-intercalation materials (e.g., carbon based materials, porous carbon, carbon nanotubes, graphene, $TiO_2$, $Li_4Ti_5O_{12}$, and so forth); (b) alloy/de-alloy materials (e.g., Si, $SiO_x$, doped Si, Ge, Sn, Al, Bi, $SnO_2$, etc.); and (c) conversion materials (e.g., transition metal oxides ($Mn_xO_y$, $Fe_xO_y$, CuO, $Cu_2O$, $MoO_2$, etc.), metal sulfides, metal phosphides and metal nitrides represented by the formula $M_xX_y$, where X=S, P, N)).

The concentration of the active anode material, e.g., graphite, silicon, lithium titanate ($Li_4Ti_5O_{12}$, often also referred to as "LTO"), $SiO_x$, silicon-graphite composite, etc., can vary, depending on the particular type of energy storage device. In illustrative examples, the active anode component is present in the electrode composition in an amount of at least 80% by weight, e.g., at least 85, 90 or 95 wt %, relative to the total weight of the (dry) electrode composition, e.g., in an amount ranging from 80% to 99% by weight, such as, within the range of from about 80 to about 85 wt %, from about 85 to about 88 wt %, from about 88 to about 90 wt %, from about 90 to about 92 wt %, from about 92 to about 95 wt % from about 95 to about 97 wt %, or from about 97 to about 99 wt %, relative to the total weight of the electrode composition.

In some embodiments, the electrode composition contains one or more binders, used, e.g., to enhance the mechanical properties of the formed electrode. Exemplary binder materials include, but are not limited to, fluorinated polymers such as poly(vinyldifluoroethylene) (PVDF), poly(vinyldifluoroethylene-co-hexafluoropropylene) (PVDF-HFP), poly (tetrafluoroethylene) (PTFE), polyimides, and water-soluble binders, such as poly(ethylene) oxide, polyvinyl-alcohol (PVA), cellulose, carboxymethylcellulose (CMC), styrene-butadiene rubber (SBR), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, and fluoro rubber and copolymers and mixtures thereof. In illustrative examples, the active anode material is graphite and the binders are either PVDF or CMC with SBR.

The binder can be present in the anode composition in an amount of about 1 to about 20% by weight, e.g., about 1-2, 2-3, 3-4, 4-5, 5-6, 6-7, 7-8, 8-9, 9-10, 10-11, 11-12, 12-13, 13-14, 15-16, 16-17, 17-18, 18-19 or 19-20 wt %.

In some implementations, the CNS loading with respect to a dry electrode composition such as used in a graphite negative electrode for LIBs, for instance, is no greater than about 5 wt % and often no greater than about 2 wt %, for example less than 1.9, 1.8, 1.7 or 1.6 wt %. In other embodiments, the CNS loading relative to a dry electrode composition such as used in a graphite anode for LIBs, for instance, is 1.5 wt % or less, e.g., at least 1.4, 1.3, 1.2, 1.2, 1.0, 0.95, 0.90, 0.85, 0.80, 0.75, 0.70, 0.65, 0.60. 0.55, 0.50. 0.45, 0.40, 0.35, 0.30, 0.25, 0.20, 0.15 or 0.10, wt %. In many implementations, the CNS loading relative to a dry electrode composition such as used in a graphite anode for lithium batteries is no greater than 0.5 wt %, e.g., within the rage of from about 0.5 wt % to 0.1 wt %, such as, within the range of from about 0.1 to about 0.2, from about 02 to about 0.3, from about 0.3 to about 0.4, or from about 0.4 to about 0.5 wt %. Other embodiments employ a loading within the range of from about 2 to about 5 wt %, e.g., a loading of at least about 2.25, 2.5, 2.75, 3.0, 3.25, 3.5, 3.75, 4.0, 4.25, 4.5 or 4.75.

For many LIBs, the CNS loading is lower than that needed with other CCAs, CB for example. In many cases, the CB particles that are used as CCAs in electrodes and could be employed to prepare comparative samples have a Brunauer-Emmett-Teller (BET) surface area greater than 50 m²/g, and an oil adsorption number (OAN) greater than 150 mL/100 g. CB specifications characterized by these and other properties known and recognized by those skilled in the art are shown as specifications I-IV in Table 3. Another type of CCA that could be used in anode compositions is illustrated by specification V (describing exemplary CNTs).

TABLE 3

| CB Speci- fication | BET SA, m²/g | STSA, m²/g | OAN, mL/100 g | # graphitic layers | $L_a$ Raman Å | ($I_G$/($I_G$ + $I_D$)) % Cr Raman | $L_c$ XRD, Å |
|---|---|---|---|---|---|---|---|
| I | 154 | 135 | 161 | N/A | 31 | 42 | 21 |
| II | 169 | 144 | 155 | N/A | 24 | 38 | 18.8 |
| III | 100 | 100 | 250 | N/A | 27 | 39 | 20.7 |
| IV | 58 | 58 | 200+ | N/A | 27.7 | 38.9 | 19.7 |
| V | 230 | N/A | N/A | 13 | 52.5 | 54.7 | 45.3 |

Suitable CB particles that can be used as CCAs, to prepare comparative samples, for instance, can be commercially-available particles. Examples include LITX® 50, LITX® 66, LITX® 200, LITX® 300 and LITX® HP carbon black particles available from Cabot Corporation; C-NERGY™ C45, C-NERGY™ C65 and SUPER P® products from Imerys; Li-400, Li-250, Li-100 and Li-435 products from Denka; and the EC300 product from Ketjen.

The electrode composition can be prepared by combining (e.g., by uniformly mixing) the constituents described above, which can be added in any order designed to obtain the mixture and, in particular, a mixture that is homogeneous. Suitable mixing techniques include mechanical agitation, shaking, stirring, etc.

In one example, an electrode (e.g., anode) composition is made by homogeneously interspersing (e.g., by uniformly mixing) a composition consisting of consisting essentially of, or comprising CNSs, or a composition prepared using a CNS starting material, with the electroactive anode component, graphite, for instance. In another example, a binder is homogeneously interspersed with a CNS-containing composition and with graphite or another suitable active anode component.

When provided in some forms, e.g., as a loose particulate material such as granules, pellets, or flakes, CNSs can be directly incorporated in a slurry containing the active electrode material (e.g., graphite, silicon, $SiO_x$, etc.).

In other embodiments, pellets, granules, flakes or other forms of loose CNS particles are first dispersed in a liquid medium, e.g., PVDF, or an aqueous formulation of CMC and/or SBR, generating CNS fragments (including partially fragmented CNSs) and/or fractured CNTs. The dispersion can be prepared from a starting material such as, for example, uncoated, PU- or PEG-coated CNS, or CNSs having any other polymeric binder coating. In one implementation, the electroactive material, graphite, for example, is added to a mixture of CNS granules, pellets, flakes, etc., in the presence of a liquid binder such as, for example, an aqueous binder formulation of CMC and/or SBR, or a NMP-based formulation including PVDF.

Illustrative CNS fragment sizes present in the dispersion can be within the range of from about 0.5 to about 20 µm, e.g., within the range of from about 0.5 to about 1 µm; from about 1 to about 5 µm; from about 5 to about 10 µm; from about 10 to about 15 µm; or from about 15 to about 20 µm. In some cases, reducing the fragment size too much, e.g., to less than 0.5 µm, can compromise the electrical properties associated with utilizing CNSs.

The resulting electrode composition can take the form of a paste or a slurry that combines an anode electroactive material, a CNS-based conductive additive, dispersant(s) (if present), nonconductive additive(s) (if present), solvent, and binder (if present). In other embodiments, the electrode composition is a solid formed by the removal of solvent from the paste or slurry. Drying techniques that can be employed include air drying, heating (in a suitable oven, for instance) and so forth.

A battery electrode can be formed by applying an electrode composition such as the anode composition described above, e.g., in the form of a paste, onto an electrically conducting substrate (e.g., an aluminum or copper current collector), followed by removing the solvent. The paste can be applied by techniques such as doctor blade coating, reverse comma bar coating or extrusion.

In some implementations, the paste has a sufficiently high solids loading (i.e., high concentration of solids) to enable deposition onto the substrate while minimizing the formation of inherent defects (e.g., cracking) that may result with a less viscous paste (e.g., having a lower solid loading). Moreover, a higher solids loading reduces the amount of solvent needed and its removal.

Solvent is removed by drying the paste, either at ambient temperature or under low heat conditions, e.g., temperatures ranging from 20° to 100° C. The deposited electrode/current collector can be cut to the desired dimensions, optionally followed by calendering.

One illustrative approach for the preparative process may include some or all of the following steps: wetting and homogenizing CNSs; optionally pre-dispersing wetted CNS; combining the wetted or pre-dispersed CNSs with graphite and forming a dispersion; combining the CNSs-graphite dispersion with a binder and preparing a final dispersion (in the form of a paste or slurry, for instance) containing CNSs, graphite and binder; casting the dispersion onto a collector (foil), followed by drying.

In one specific example, an anode targeting a 14 mg/cm² coating area loading and containing 0.5 wt % CNSs (including CNS-derived components such as CNS fragments and/or fractured CNTs), 95.5 wt % graphite, and 4% CMC/SBR (2:1) binders is produced by the following protocol. CNSs are combined with an aqueous solution of carboxymethyl-cellulose (CMC) and mixed (using a Thinky planetary mixer, for instance) mill for several (e.g., 12) minutes, followed by the addition of graphite and further mixing (e.g., for several (e.g., 12 minutes) using the same Thinky mixer. SBR is then added, followed by several (e.g., 12 minutes) of further mixing in the Thinky mixer. The composition is applied to a metal (Cu, for instance) foil and dried.

The process leading to the formation of the electrode can preserve the integrity of some of the initial CNSs used, which will remain intact. Some process operations and/or conditions, however, can alter at least some of the initial CNSs employed. As described above, one example involving such an operation and/or condition is the application of shear forces, as encountered, for instance, when preparing an emulsion from a CNS starting material.

In some situations, an initial CNS is broken into smaller CNS units or fragments. Except for their reduced sizes, these fragments generally share the properties of intact CNS and can be identified by electron microscopy and other techniques, as described above.

Also possible are changes in the initial nanostructure morphology of the CNS. For example, applied shear can break crosslinks between CNTs within a CNS to form CNTs that typically will be dispersed as individual CNTs in the electrode composition. It is found that structural features of branching and shared walls are retained for many of these CNTs, even after the crosslinks are removed. CNTs that are derived (prepared) from CNSs and retain structural features of CNT branching and shared walls are referred to herein as "fractured" CNTs. These species are capable of imparting improved interconnectivity (between CNT units), resulting in better conductivity at lower concentrations.

Thus, in comparison to electrodes or electrode compositions that employ ordinary, individualized CNTs, e.g., in pristine form, electrodes and electrode compositions described herein will often include fractured CNTs. These fractured CNTs can readily be differentiated from ordinary carbon nanotubes through standard carbon nanotube analytical techniques, such as SEM, for example. It is further noted that not every CNT encountered needs to be branched and share common walls; rather it is a plurality of fractured CNTs, that, as a whole, will possess these features.

The formed electrode can be incorporated into a lithium-ion battery according to methods known in the art, for example, as described in "Lithium Ion Batteries Fundamentals and Applications", by Yuping Wu, CRC press, (2015). In some embodiments, the batteries are coin types such as, for example, 2032 coin-cells, 18650 cylindrical cells, pouch cells, and others. In addition to the anode containing a CNS material, e.g., as described above, the battery includes other components, e.g., a cathode made, for example of cathode materials based on intercalation chemistry, e.g., typically involving chemical reactions that transfer a single electron. Other types of cathode materials (having lithium ions inserted into $FeF_3$, for instance) can transfer multiple electrons through more complex reaction mechanisms, called conversion reactions.

Examples of suitable cathode electroactive materials include but are not limited to LCO, LMO, NCM, NCA, LCP, LFP, LFSF, LTS and others, as known in the art or as developed in the future. In some embodiments, the CNS-containing anode composition described above is used in conjunction with NCM or NCA cathode compositions. NCM (also referred to as "NMC") and NCA are generally known to those skilled in the art of batteries.

In more detail, NCM can be represented by the formula $Li_{1+x}(Ni_yCo_{1-y-z}Mn_z)_{1-x}O_2$, wherein x ranges from 0 to 1, y ranges from 0 to 1 (e.g., 0.3-0.8), and z ranges from 0 to 1 (e.g., 0.1-0.3). Examples of NCMs include $Li_{1+x}(Ni_{0.33}Co_{0.33}Mn_{0.33})_{1-x}O_2$, $Li_{1+x}(Ni_{0.4}Co_{0.3}Mn_{0.3})_{1-x}O_2$, $Li_{1+x}(Ni_{0.4}Co_{0.2}Mn_{0.4})_{1-x}O_2$, $Li_{1+x}(Ni_{0.4}Co_{0.1}Mn_{0.5})_{1-x}O_2$, $Li_{1+x}(Ni_{0.5}Co_{0.1}Mn_{0.4})_{1-x}O_2$, $Li_{1+x}(Ni_{0.5}C_{0.3}Mn_{0.2})_{1-x}O_2$, $Li_{1+x}(Ni_{0.5}Co_{0.2}Mn_{0.3})_{1-x}O_2$, $Li_{1+x}(Ni_{0.6}Co_{0.2}Mn_{0.2})_{1-x}O_2$, and $Li_{1+x}(Ni_{0.8}Co_{0.1}Mn_{0.1})_{1-x}O_2$.

NCA can be represented by the formula $Li_{1+x}(Ni_yCo_{1-y-z}Al_z)_{1-x}O_2$, wherein x ranges from 0 to 1, y ranges from 0 to 1, and z ranges from 0 to 1. An example of an NCA is $Li_{1+x}(Ni_{0.8}Co_{0.15}Al_{0.05})_{1-x}O_2$.

The concentration of NCM or NCA in the electrode composition can vary, depending on the particular type of energy storage device. In some cases, the NCM or NCA is present in the electrode composition in an amount of at least 90% by weight, e.g., greater than 95% by weight, relative to the total weight of the electrode composition, e.g., an amount ranging from 90% to 99% by weight, relative to the total weight of the electrode composition.

In addition to the cathode electroactive material, cathode compositions often include a binder, e.g., poly(vinyldifluoroethylene) (PVDF). Other binders, such as those described above, for instance, can be employed to prepare the cathode composition.

In some embodiments, the cathode composition also contains a conductive additive, such as, for instance a CCA. Examples include CB, CNTs, graphite, graphene and so forth.

In one implementation, the cathode composition includes CNSs, CNS fragments and/or fractured CNTs. Such cathode compositions their preparation and use are described in U.S. Provisional Patent Application No. 62/822,097, with the title Cathode Electrode Compositions for Battery Applications, filed on Mar. 22, 2019 and in U.S. Non Provisional Patent application Cathode Electrode Compositions for Battery Applications, filed concurrently herewith, the entire contents of both being incorporated herein by this reference. In many cases, the CNSs employed to prepare the cathode composition are coated, e.g., PU- or PEG-coated. When dried, illustrative cathode compositions contain carbon nanostructures, carbon nanostructure fragments and/or fractured nanotubes in an amount no greater than about 1 wt %. Thus, in specific embodiments of the invention, both anode and cathode contain CNSs, fragments of CNSs and/or fractured CNTs.

In addition to the two electrodes, the Li ion battery comprises a suitable electrolyte. Examples include, for instance, ethylene carbonate-dimethyl carbonate-ethylmethyl carbonate (EC-DMC-EMC), vinylene carbonate (VC), $LiPF_6$; ethylene carbonate-diethylcarbonate (EC-DEC, $LiPF_6$; or (EC-DMC), $LiPF_6$. Furthermore, electrolyte composition may contain special additives known to enhance the performance of $SiO_x$ or silicon comprising anodes, for example fluorinated carbonates, such as fluoroethylene carbonate and others. A suitable glass fiber micro filters (for example, Whatman GF/A) or polypropylene/polyethylene membrane (for example, Celgard 2300) is used as a separator that absorbs electrolyte and prevents electrical contact between electrodes while allowing diffusion of Li ions.

In other embodiments, the compositions described herein are used (e.g., incorporated) in electrodes of other energy storage devices, such as, primary alkaline batteries, primary lithium batteries, nickel metal hydride batteries, sodium batteries, lithium sulfur batteries, lithium air batteries, and supercapacitors. Methods of making such devices are known in the art and are described, for example, in "Battery Reference Book", by TR Crompton, Newness (2000).

Figure 4A:
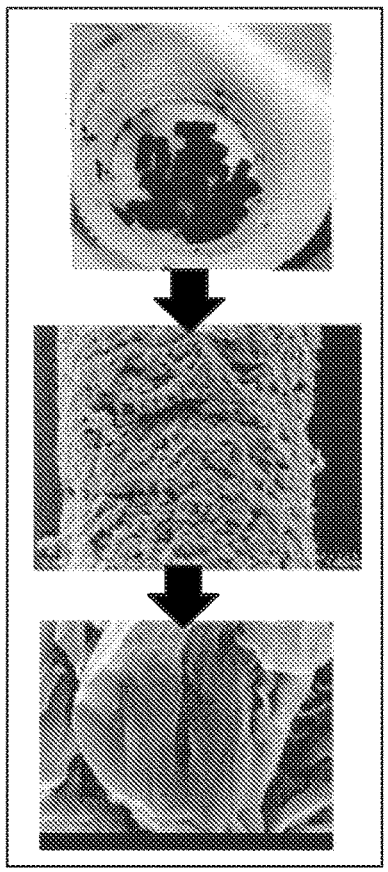
FIG. 4A is a series of optical and SEM images of CNS granules.
Figure 4B:
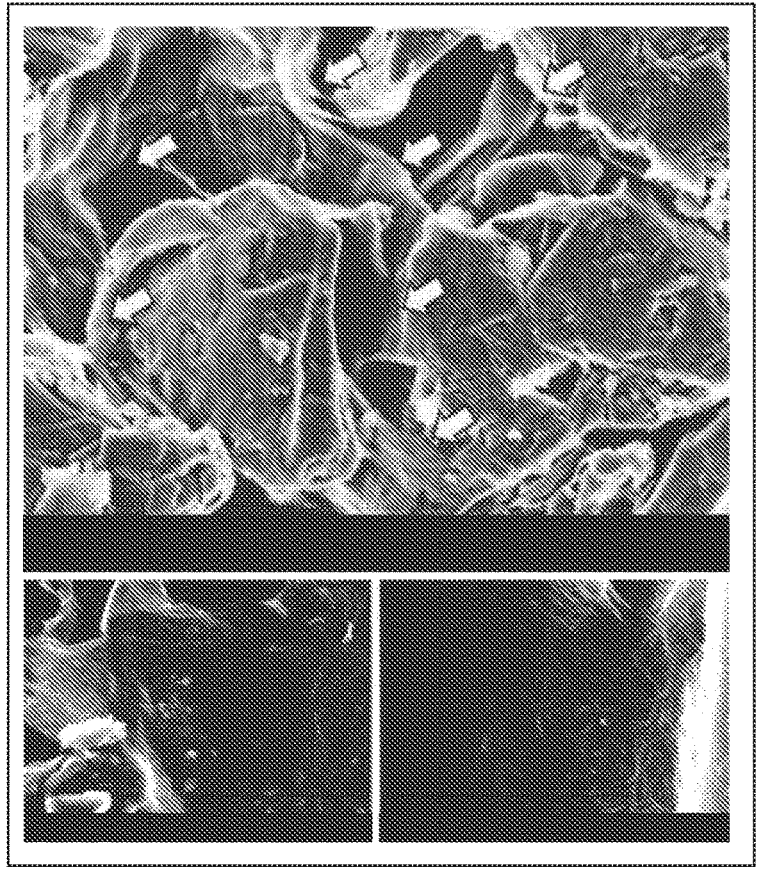
FIG. 4B is a series of SEM images, at various magnifications, of a graphite anode prepared using CNSs.

Various techniques can be employed to characterize the electrode compositions, electrodes and batteries or described herein, and/or identify the presence of CNSs. Examples include but are not limited to electron microscopy, e.g., TEM, SEM, Raman spectrometry, or other suitable qualitative or quantitative analytical methods. For example, optical and scanning electrode microscope (SEM) images of CNS granules (FIG. 4A) and graphite anode comprising CNS (FIG. 4B) are shown at various magnifications. White arrows show CNS in graphite at lower magnification, whereas the bottom right images demonstrate the CNS in the graphite anode at higher resolution.

Electrode performance and/or properties can be evaluated by procedures known in the art, or techniques adapted or developed. Suitable techniques include, for instance, in-plane and thru plane electrode conductivity, electrochemical impedance spectroscopy (EIS), constant current charge-discharge, hybrid pulse power capability (HPPC), cycling. Some examples are described below.

Even at relatively low levels, CNSs and/or CNS-derived components such as CNS fragments and/or fractured CNTs appear capable of providing conductive networks in electrodes. Anodes prepared using CNSs often perform better than anodes that do not include a conductive additive. In one example, the voltage profile during cycling (cycle 1→100) with 2 C cycling and 0.5 discharging of a graphite only anode exhibits fast capacity decay. In contrast, a graphite anode prepared using CNSs, as described herein, displayed barely any changes, even at CNSs loadings that are as low as 0.1 wt % (based on the weight of a dry anode composition).

In some embodiments, electrodes containing CNSs perform a well as comparative electrodes (made with the same active electrode material, e.g., graphite, binder, and other ingredients, if used, e.g. dispersant) that contain CB at a higher loading. For example, anodes prepared using CNSs at loadings no higher than about 0.5 wt %, (in some cases just 0.1 wt %) of a dry anode impart at least as good a performance as electrodes containing 1 or more wt % of CB. In other implementations, anodes containing a certain CNS loading, e.g., 0.5 wt % or lower, display a performance (expressed as capacity retention with cycling) that is at least as good as and often considerably better than that of comparative electrodes containing the same amount of CB.

The invention is further illustrated by the following non-limited examples.

EXAMPLES

Comparative Example 1—Preparation and Testing of Graphite Anodes in Full Coin Cells 48 g of graphite (grade BTR-918, available from BTR, China) was measured and placed into 150 ml container from Thinky mixer (model ARE-310). A combination of 20 grams of 10 wt % Kynar® HSV 900 polyvinylidene fluoride-based resin (PVDF) by Arkema in N-methyl-2-pyrrolidone (NMP, Sigma Aldrich >99% HPLC grade), prepared in advance, was combined with the graphite and then 32 g of neat NMP was added. Two ¼ inch diameter tungsten carbide media were carefully placed into the container and closed.

A Thinky planetary mixer (model ARE-310) was used to prepare the anode coating slurry by the following procedure. First, the mixture was run at 2000 rpm for 30 sec and checked to determine whether all materials were incorporated. Then, the container was closed and a standard program method that included 4 min at 2000 rpm, rest for 3 min, 4 min at 2000 rpm, rest for 4 min and 4 min at 2000 rpm was run. The composition of the slurry was 96 wt % graphite: 4 wt % PVDF binder on a dry basis.

The resulting anode slurry was coated on copper foil using an automated doctor blade coater (Model MSK-AFA-III from MTI Corp.) targeting a 14.5 mg/cm² coating area loading. The NMP was evaporated for 20 minutes in a convection oven set at 80° C. Further, the electrode was dried at 110° C. under vacuum for a minimum of 4 hours. Sixteen-millimeter-in-diameter discs were punched by using MTI Precision Disc Cutter (model MSK-T-06), and calendared to 1.35 g/cc using manual rolling press (MR-100 from MTI Corp).

The cathodes used in all the examples involved cathode electrodes prepared with the following composition: NCM622 active material; a CB conductive additive having the properties of sample III in Table 3; HSV 900 PVDF binder, in the ratio of 96.5:2:1.5. Specifically, the cathode was prepared by mixing an appropriate amount of 10 wt % Kynar® HSV 900 PVDF (Arkema with molecular weight of 900,000) in NMP (Sigma Aldrich >99% HPLC grade), the CB conductive additive and NCM 622 (available from ShanShan, China) at 75 wt % total solids in NMP. The slurry was mixed with a Thinky mixer (model ARE-310) for 30 minutes. The electrode slurries were coated on aluminum foils using an automated doctor blade coater (Model MSK-AFA-III from MTI Corp.) targeting 25 mg/cm² coating area loading. The NMP was evaporated for 20 minutes in a convection oven set at 80° C. Fifteen-millimeter-in-diameter discs were punched for coin-cell preparation and dried at 110° C. under vacuum for a minimum of 4 hours. Discs were calendared to 3.5 g/cc density with MTI Manual Rolling Press (model MR-100).

Cathode and anode discs described above were assembled into 2032 coin-cells in an argon-filled glove box (M-Braun) with anode/cathode capacity ratio of 1.25. Glass fiber micro filters (Whatman GF/A) with 17 mm diameter were used as separators. The electrolyte was 200 microliters of ethylene carbonate-dimethyl carbonate-ethylmethyl carbonate (EC-DMC-EMC), vinylene carbonate (VC) 1%, LiPF6 1M (BASF). Four coin-cells were assembled for each formulation tested. Coin cells were formed using a Maccor series 4000 battery cycler using 2×C/10 charge-discharge formation cycles in 2.8-4.2 voltage window, with constant voltage charging step up to C/20, then C/2 charging with a constant voltage charging step up to C/20.

Comparative Example 2—Preparation of the Graphite Anodes Comprising Carbon Black 47.5 g of graphite (grade BTR-918, available from BTR, China) and 0.5 g of conductive carbon black having the properties of specification I in Table 3) were weighed and combined with 20 grams of 10 wt % PVDF in NMP solution in 150 mL container. 32 g of neat NMP was added. The composition of the slurry was 95 wt % graphite: 1 wt % CB: 4 wt % PVDF on the dry basis. The rest of the preparation protocol for anode, cathode and full coin cell assembly were identical to Example 1.

Example 3—Preparation of Graphite Anodes Comprising Various Amounts of CNS

Several anode slurries (A-C) were prepared comprising various amounts of CNS, ranging from 0.1 wt to 0.5 wt % on the dry basis. Detailed composition and weight of the components (on the dry basis) are summarized in the Table 4. The preparation protocols for anode, cathode and full coin cell assembly were identical to those in Example 1.

TABLE 4

| Anode composition | Graphite, wt % | CCA, wt % | PVDF, wt % | Graphite mass, g | CNS mass, g | PVDF mass, g |
|---|---|---|---|---|---|---|
| A | 95.9 | 0.1 | 4 | 47.95 | 0.05 | 2 |
| B | 95.75 | 0.25 | 4 | 47.875 | 0.125 | 2 |
| C | 95.5 | 0.5 | 4 | 47.75 | 0.25 | 2 |

Performance Characteristics

Figure 5:
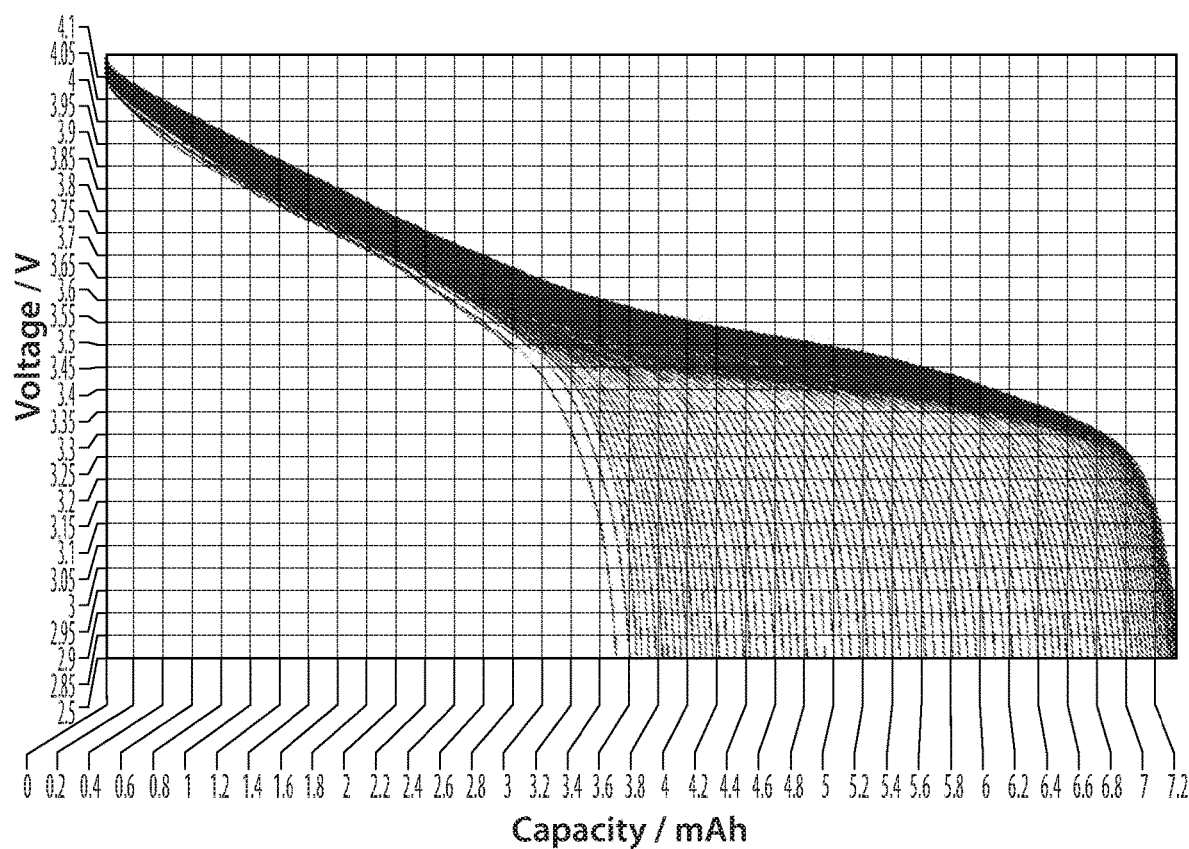
FIG. 5 is a series of plots showing the voltage discharge profile for the first 100 cycles at 2 C charging and C/2 discharging rates for a cell with a graphite only anode prepared according to Example 1.

Presented in FIG. 5 is the voltage discharge profile for the first 100 cycles at 2C charging and C/2 discharging rates for the cell described in Example 1 (graphite only anode). Testing was conducted at 25° C.

Fairly aggressive conditions were selected to intentionally promote lithium plating at the graphite anode. The charging rate was 2 C and the anode thickness was 14.5 mg/cm². As shown in FIG. 5, the cell capacity quickly dropped within first 100 cycles. The cell was fully discharged after 100 cycles, placed in an argon glove box and carefully opened. The anode had pronounced irregular yellow color indicating lithium metal plating.

Figure 6:
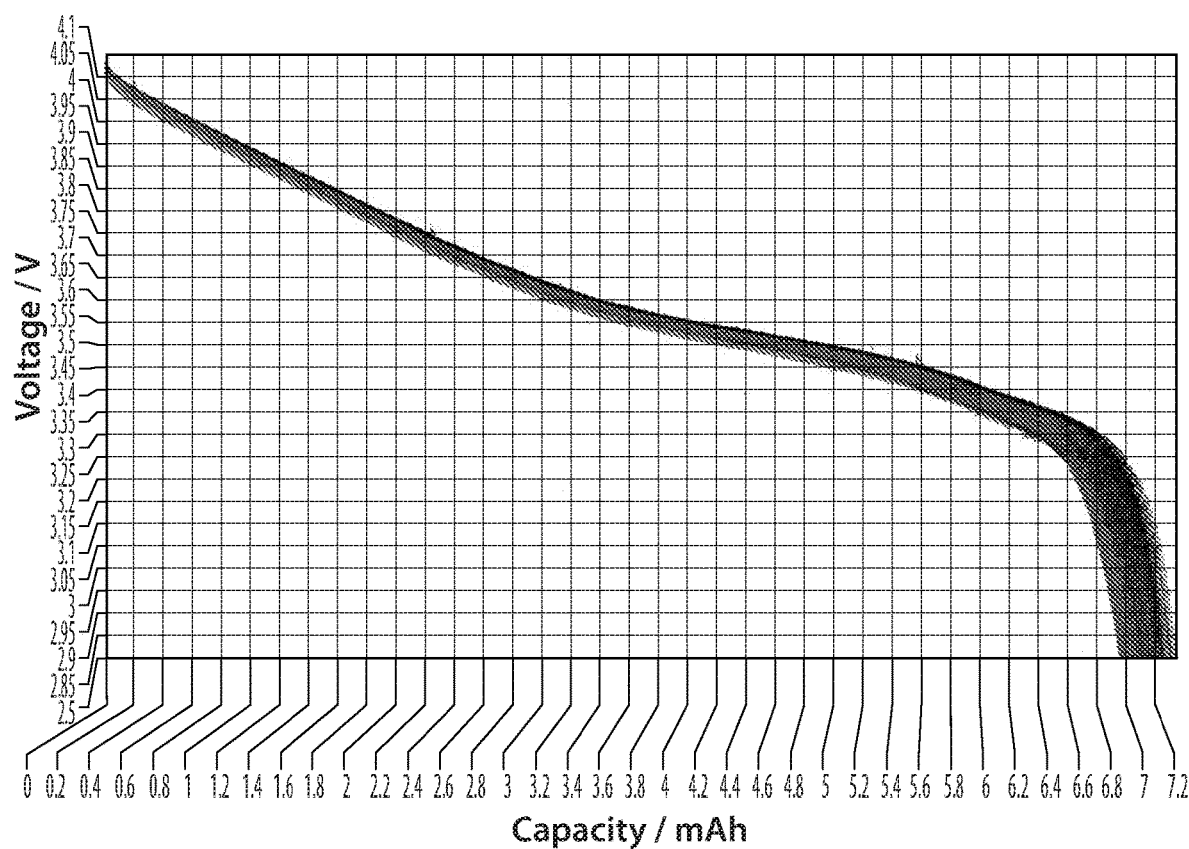
FIG. 6 shows the voltage discharge profile for 100 cycles with 2 C charging and C/2 discharging rates for a cell including a graphite anode prepared using CNSs (Example 3)

Voltage discharge profile for 100 cycles with 2 C charging and C/2 discharging rates for the cell described in Example 3 (CNSs in graphite anodes) are shown in FIG. 6. Testing was conducted at 25° C.

In contrast to the cycling results for the cell with graphite only anode, the cycling data with the cells comprising CNSs in the anode showed stable voltage at the same conditions. Surprisingly even very small amount (0.1 wt %) of CNS was effective to minimize or reduce Li plating on anode. No obvious sign of lithium plating was observed upon opening one of the cells comprising 0.25 wt % CNS.

Perhaps a better way to illustrate the impact of CNSs on the cycle life is to extrapolate the existing data for Examples 1-3 with the simple exponent function such as y=a+b*exp{c*cycle#}.

Figure 7:
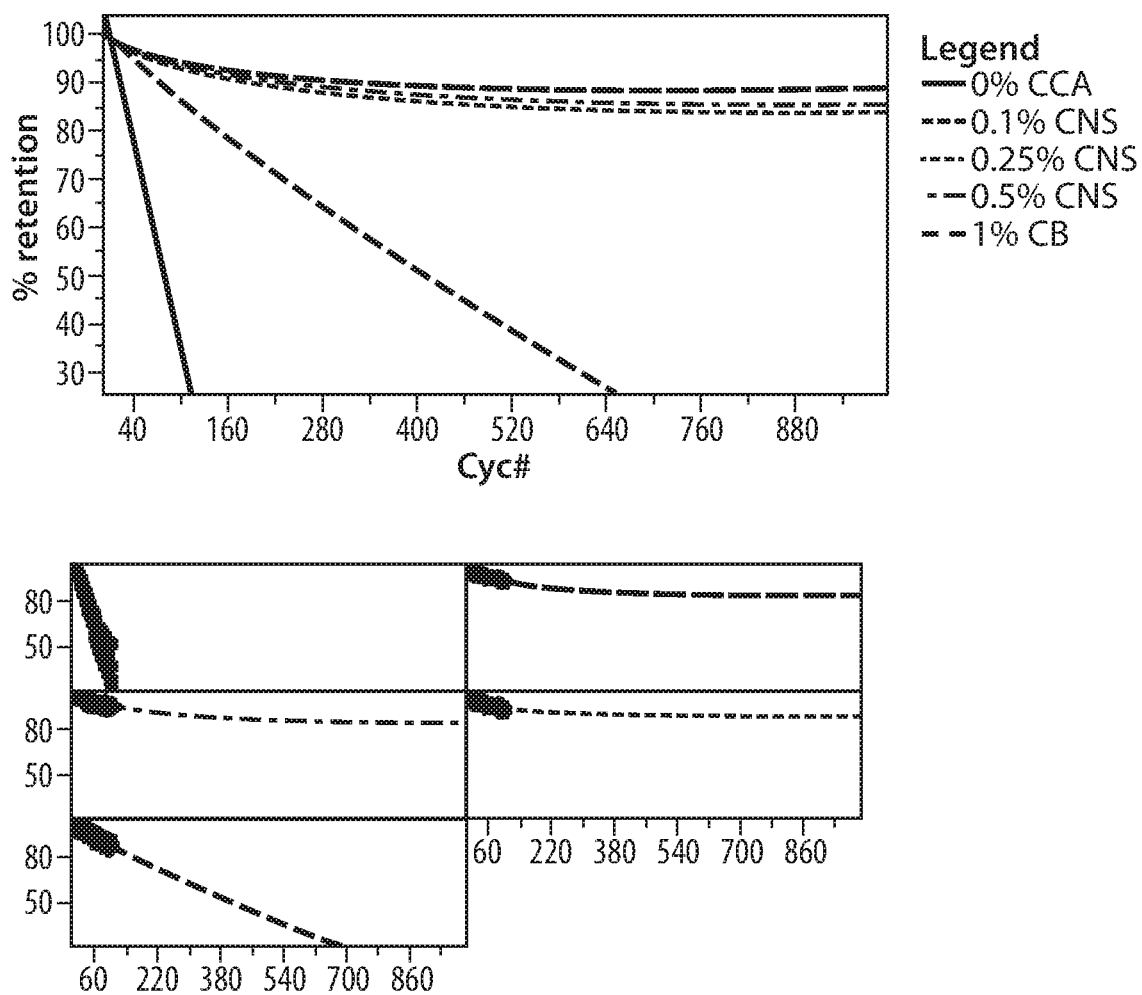
FIG. 7 shows the capacity retention with cycling and its extrapolation for the cells prepared according to Example 1-3. Actual data for the first 100 cycles for each type of cell is shown with the solid circles (bottom part of the FIG. 5)

Summarized in FIG. 7 are the results of applying three parameter exponent function to extrapolate the cycling life. The figure shows capacity retention with cycling and its extrapolation for the cells prepared according to Examples 1-3. Actual data for the first 100 cycles for each example are shown with the solid circles (bottom part of the FIG. 7). Cycling conditions were 2C charging, C/2 discharging at 25° C. A three-parameter simple exponent function (% retention=a+b*exp{c*cycle#}) was used for data extrapolation for all examples.

As evident from the results, the addition of a conductive additive (such as CB) to graphite helped with extending the cycle life (Example 2), however more impressive results were obtained with a CNS additive (Example 3). Data modeling based on initial capacity fading indicated that 1000+ cycle life can be possible with CNS-comprising anodes despite aggressive cycling conditions.

Comparative Example 4—Preparation of Anode Electrodes Comprising MWCNT and Super® P-Li An anode electrode comprising both multiwall carbon nanotube (LB217, from 5% aq. dispersion of CNTs (available from Jiangsu Cnano Technology Co. Limited)) and Super® P-Li conductive carbon powder (available from Imerys) was prepared in the same manner as described above with the following composition: 94.5 wt % graphite/ $SiO_x$ (with the ratio of graphite to $SiO_x$=95:5): 1.5 wt % MWCNT: 1 wt % Super® P-Li: 2 wt % CMC:1 wt % SBR on a dry basis. The electrode had 5.2 mg/cm² loading.

The anode was pre-dried in the oven at 110° C. for 120 minutes. Further, the electrode was dried at 110° C. under vacuum overnight. Sixteen millimeter-in-diameter discs were punched by using MTI Precision Disc Cutter (model MSKT-06) and calendared to 1.2 g/cc using manual rolling press (MR-100, MTI Corp).

The cathode was formulated with the following composition—NCM622 active material: LITX® HP carbon conductive additive: HSV 900 PVDF binder in the ratio of 96.5:2:1.5 on the dry basis.

Specifically, the cathode slurry was prepared by mixing an appropriate amount of 10 wt % Kynar® HSV 900 PVDF (Arkema) in NMP (Sigma Aldrich >99% HPLC grade), the carbon conductive additive LITX® HP (available from Cabot Corporation) was added along with NCM 622 (available from ShanShan, China) at 75 wt % total solids in NMP. The slurry was mixed with a Thinky mixer (model ARE-310) for 30 minutes. The electrode slurries were coated on aluminum foil using an automated doctor blade coater (Model MSK-AFA-III from MTI Corp.) targeting 14 mg/cm² areal loading. The NMP was evaporated for 20 minutes in a convection oven set at 80° C. Fifteen millimeter-in-diameter discs were punched for coin-cell preparation and dried at 110° C. under vacuum for a minimum of 4 hours. Discs were calendared to 3.5 g/cc density with MTI Manual Rolling Press (model MR-100).

Cathode and anode discs described above were assembled into 2032 coin-cells in an argon-filled glove box (M-Braun) with anode/cathode capacity ratio of 1.25. Glass fiber micro filters (Whatman GF/A) with 17 mm diameter were used as separators. The electrolyte composition was ethylene carbonate-dimethyl carbonate (EC:DMC, 1:1) and included 10 wt % mono-fluoroethylene carbonate (FEC, Solvay Fluorides) with 1M LiPF6 (Sigma Aldrich). Four coin-cells were assembled for each tested formulation. Coin cells were formed using a Maccor series 4600A battery cycler using 2×C/10 charge-discharge formation cycles in 2.8-4.2 voltage window. After c-rate capability evaluation, the coin cells were cycled at room temperature using CC-CV (1C-4.2V, C/20)/1D charge/discharge rates.

Example 5—Preparation of an Anode Slurry and Anode Electrodes Using CNSs

A combination of 17.64 grams of aqueous 2 wt % Carboxymethyl Cellulose, Sodium Salt (CMC) with 16.16 grams of graphite (BTR-918, available from BTR, China) was placed into 50 ml steel jacketed tungsten carbide vial (model 8004SS) and gently mixed. 0.1 gram of encapsulated CNS granules (Cabot Corporation) was then added along with six ¼ inch diameter tungsten carbide media. The vial was closed and mixed by using a Spex Sample Prep Mixer (model 8000M) for 80 min. The mixer was stopped every 20 min to determine whether all materials were incorporating. After 80 min of mixing, 0.85 grams SiOx/C powder (KSC-1265, available from Shin-Etsu Chemical Co., Ltd) was added to the mixture and mixed for additional 3 minutes. After that, 0.353 grams Styrene-Butadience Rubber (TD105A, JSR) was combined with the mixture and mixed for 1 minute. Finally, 14.35 grams of deionized water was added to the slurry, and the vial was mixed for additional 10 minute. The composition of the slurry was 96.45 wt % graphite/$SiO_x$ (with the ratio of graphite to $SiO_x$=95:5): 0.55 wt % encapsulated CNS: 2 wt % CMC: 1 wt % SBR on a dry basis.

The resulting anode slurry was coated on copper foil using an automated doctor blade coater (Model MSK-AFA-III from MTI Corp.) targeting 5.2 mg/cm² areal loading. The anode was pre-dried in the oven at 110° C. for 120 minutes. Further, the electrode was dried at 110° C. under vacuum overnight. Sixteen millimeter-in-diameter discs were punched by using MTI Precision Disc Cutter (model MSKT-06) and calendared to 1.2 g/cc using manual rolling press (MR-100, MTI Corp).

Cathodes and coin cell assemblies were prepared according to the protocol described in Comparative Example 4.

Figure 8:
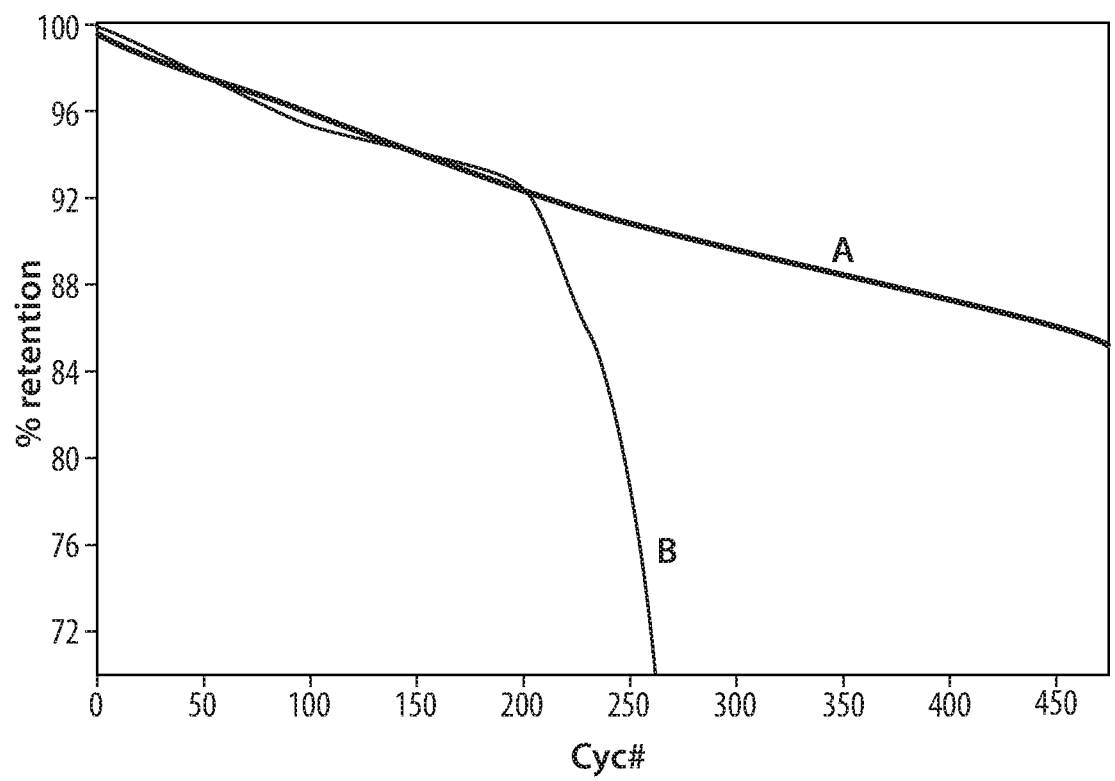
FIG. 8 compares the capacity retention for cells with $SiO_x$-containing anodes and comprising (A) 0.55 wt % CNS; and (B) 1.5 wt % MWCNT and 1% Super® P-Li as conductive additives.

Shown in FIG. 8 is the plot of capacity retention with 1C/1C cycling for the full cells with anodes comprising CNS (labeled with A), prepared as described in Example 5, and a combination of MWCNT+Super® P additives (labeled as B), prepared as described in Comparative Example 4. As evident from the graph, the battery cells with the anodes containing CNS significantly extended the cycle life performance. The combination of MWCNT and Super® P-Li as conductive additives was only effective up to ~250 cycles (~80% retention) at these cycling conditions. More importantly, the amount of encapsulated CNS required for such performance was only ~¼ to ~⅕ of the total carbon additives used in the comparative example (0.55 wt % CNS vs 2.5 wt % total in case of MWCNT+Super® P-Li). This example clearly highlights the unique feature of CNS morphology that enables better cycling performance for $SiO_x$-graphite anode based cells.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While this invention has been particularly shown and described with references to preferred embodiments thereof, it will be understood by those skilled in the art that various changes in form and details may be made therein without departing from the scope of the invention encompassed by the appended claims.

What is claimed is:

1. An electrode composition, comprising:
   an active anode material; and
   at least one material selected from the group consisting of:
   carbon nanostructures, fragments of carbon nanostructures and fractured multiwall carbon nanotubes,
   wherein the active anode material includes graphite, silicon, $SiO_x$, silicon-graphite composite or lithium titanate
   wherein the carbon nanostructures or fragments of carbon nanostructures include a plurality of multiwall carbon nanotubes that are crosslinked in a polymeric structure by being branched, interdigitated, entangled and/or sharing common walls, and
   wherein the fractured multiwall carbon nanotubes are derived from carbon nanostructures and are branched and share common walls with one another.

2. The electrode composition of claim 1, wherein:
   at least one of the multiwall carbon nanotubes has a length equal to or greater than 2 microns, as determined by SEM,
   at least one of the multiwall carbon nanotubes has a length to diameter aspect ratio within a range of from 200 to 1000,
   there are at least two branches along a 2-micrometer length of at least one of the multiwall carbon nanotube, as determined by SEM,
   at least one multiwall carbon nanotube exhibits an asymmetry in the number of walls observed in the area after a branching point relative to the area prior to the branching point, and/or
   no catalyst particle is present at or near branching points, as determined by TEM.

3. The electrode composition of claim 1, wherein the multiwall nanotubes include 2 to 30 coaxial nanotubes, as determined by TEM at a magnification sufficient for counting the number of walls.

4. The electrode composition of claim 1, wherein at least 1% of the carbon nanotubes have a length equal to or greater than 2 microns, as determined by SEM,
   a length to diameter aspect ratio within a range of from 200 to 1000, and/or exhibit an asymmetry in the number of walls observed in the area after a branching point relative to the area prior to the branching point.

5. The electrode composition of claim 1, wherein the composition further includes a binder.

6. The composition of claim 5, wherein the binder is polyvinylidene difluoride, or carboxymethylcellulose and styrene butadiene rubber.

7. The electrode composition of claim 1, wherein the composition is a paste, a slurry or a solid.

8. The electrode composition of claim 7, wherein the composition further includes a solvent.

9. The electrode composition of claim 8, wherein the solvent is N-methylpyrrolidone, acetone, an alcohol, water, or any combination thereof.

10. The electrode composition of claim 1, wherein the electrode composition, when dried, contains carbon nanostructures, carbon nanostructure fragments and/or fractured multiwall nanotubes in an amount no greater than about 5% by weight.

11. The electrode composition of claim 1, wherein the carbon nanostructures are coated carbon nanostructures.

12. The electrode composition of claim 11, wherein the coated carbon nanostructures are polyurethane-coated nanostructures or polyethylene glycol-coated carbon nanostructures.

13. The electrode composition of claim 11, wherein a weight of the coating relative to the weight of the coated carbon nanostructures is within the range of from about 0.1% to about 10%.

14. The electrode composition of claim 11, wherein the electrode composition, when dried, contains coated carbon nanostructures, fragments of coated carbon nanostructures and/or fractured multiwall carbon nanotubes derived from the coated carbon nanostructures in an amount no greater than about 5 wt %.

15. The electrode composition of claim 1, comprising the active anode material in an amount of from 80 to 99 weight %.

16. The electrode composition of claim 1, further comprising a carbon conductive additive selected from the group consisting of carbon black, individualized carbon nanotubes in pristine form and any combination thereof.

17. The electrode composition of claim 1, further comprising a carbon black, wherein the carbon black has a BET area of 200 m$^2$/g or less and an OAN of at least 130 mL/100 g.

18. The electrode composition of claim 1, wherein the carbon nanostructures and the fragments of carbon nanostructures are free of a growth substrate.

19. A battery comprising a composition according to claim 1.

20. A method for preparing an electrode composition, the method comprising:
- combining a dispersion, which includes at least one material selected from the group consisting of carbon nanostructures, fragments of carbon nanostructures and fractured multiwall carbon nanotubes, with an active anode material, to form the electrode composition,
- wherein the carbon nanostructures or fragments of carbon nanostructures include a plurality of multiwall carbon nanotubes that are crosslinked in a polymeric structure by being branched, interdigitated, entangled and/or sharing common walls,
- wherein the fractured multiwall carbon nanotubes are derived from carbon nanostructures and are branched and share common walls with one another, and
- wherein the active anode material includes graphite, silicon, SiO$_x$, silicon-graphite composite or lithium titanate.

21. The method of claim 20, wherein:
- at least one of the multiwall carbon nanotubes has a length equal to or greater than 2 microns, as determined by SEM,
- at least one of the multiwall carbon nanotubes has a length to diameter aspect ratio within a range of from 200 to 1000,
- there are at least two branches along a 2-micrometer length of at least one of the multiwall carbon nanotube, as determined by SEM,
- at least one multiwall carbon nanotube exhibits an asymmetry in the number of walls observed in the area after a branching point relative to the area prior to the branching point, and/or
- no catalyst particle is present at or near branching points, as determined by TEM.

22. A method for preparing an electrode composition, the method comprising incorporating carbon nanostructures in a slurry which includes an active anode material to form the electrode composition,
- wherein the active anode material includes graphite, silicon, SiO$_x$, silicon-graphite composite or lithium titanate, and
- wherein a carbon nanostructure comprises a plurality of multiwall carbon nanotubes that are crosslinked in a polymeric structure by being branched, interdigitated, entangled and/or sharing common walls.

23. The method of claim 22, wherein:
- at least one of the multiwall carbon nanotubes has a length equal to or greater than 2 microns, as determined by SEM,
- at least one of the multiwall carbon nanotubes has a length to diameter aspect ratio within a range of from 200 to 1000,
- there are at least two branches along a 2-micrometer length of at least one of the multiwall carbon nanotube, as determined by SEM,
- at least one multiwall carbon nanotube exhibits an asymmetry in the number of walls observed in the area after a branching point relative to the area prior to the branching point, and/or
- no catalyst particle is present at or near branching points, as determined by TEM.

* * * * *